US011371600B2

(12) United States Patent
Marsh et al.

(10) Patent No.: US 11,371,600 B2
(45) Date of Patent: Jun. 28, 2022

(54) FRONT AXLE ASSEMBLY

(71) Applicant: AMERICAN AXLE & MANUFACTURING, INC., Detroit, MI (US)

(72) Inventors: Gregory A. Marsh, Waterford, MI (US); Jonathan P. Prichard, Harrison Township, MI (US); Frederick E. Zink, Capac, MI (US); James P. Downs, South Lyon, MI (US); Joseph M. Endreszl, Garden City, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 366 days.

(21) Appl. No.: 16/621,176

(22) PCT Filed: Sep. 25, 2018

(86) PCT No.: PCT/US2018/052595
§ 371 (c)(1),
(2) Date: Dec. 10, 2019

(87) PCT Pub. No.: WO2019/060881
PCT Pub. Date: Mar. 28, 2019

(65) Prior Publication Data
US 2021/0003205 A1 Jan. 7, 2021

Related U.S. Application Data

(60) Provisional application No. 62/562,567, filed on Sep. 25, 2017.

(51) Int. Cl.
*F16H 57/039* (2012.01)
*B60B 35/00* (2006.01)
*B60B 35/16* (2006.01)

(52) U.S. Cl.
CPC .......... *F16H 57/039* (2013.01); *B60B 35/003* (2013.01); *B60B 35/16* (2013.01); *B60B 2310/302* (2013.01)

(58) Field of Classification Search
CPC .......... F16H 57/037; F16H 2057/02052; B60B 35/003; B60B 35/16; B60B 2310/302
See application file for complete search history.

(56) References Cited

U.S. PATENT DOCUMENTS 1,033,511 A * 7/1912 Zimmerman ........... F16H 48/08
180/250
2,477,576 A * 8/1949 Buckendale .......... F16H 57/037
74/607

(Continued)

FOREIGN PATENT DOCUMENTS

JP 2016032965 A 3/2016
KR 20130014044 A * 2/2013 ........... F16H 57/037

OTHER PUBLICATIONS

International Search Report and Written Opinion of the International Searching Authority issued in PCT/US2018/052595, dated Jan. 17, 2019; ISA/KR.

*Primary Examiner* — Thomas C Diaz
(74) *Attorney, Agent, or Firm* — Burris Law, PLLC

(57) ABSTRACT

A front axle assembly with an axle housing that has first and second housing halves that each include a main housing portion, a tubular portion and a steering yoke. The main housing portion defines a cavity that houses at least a portion of a speed differentiation mechanism. The tubular portions are fixedly coupled to an associated one of the main housing portions and extend between the main housing portion and an associated one of the steering yokes. Each steering yoke is fixedly coupled to an associated tubular portion. An annular joint structure is formed where the first and second first housing halves are coupled to one another. The annular (Continued)

joint structure is formed about the rotary axis such that one of the first and second housing halves is inserted into the other one of the first and second housing halves along an insertion axis that is coincident with the rotary axis.

30 Claims, 17 Drawing Sheets

(56) References Cited

U.S. PATENT DOCUMENTS

| | | | |
|---|---|---|---|
| 5,664,847 A * | 9/1997 | Bear | B60K 17/16 |
| | | | 301/124.1 |
| 6,994,405 B2 * | 2/2006 | Li | B60B 35/003 |
| | | | 301/124.1 |
| 9,677,656 B2 * | 6/2017 | Downs | B60B 35/16 |
| 2014/0251081 A1 | 9/2014 | Huang et al. | |
| 2014/0364264 A1 | 12/2014 | Sten | |
| 2016/0101691 A1 | 4/2016 | Valente | |
| 2017/0198799 A1 | 7/2017 | Downs et al. | |

\* cited by examiner

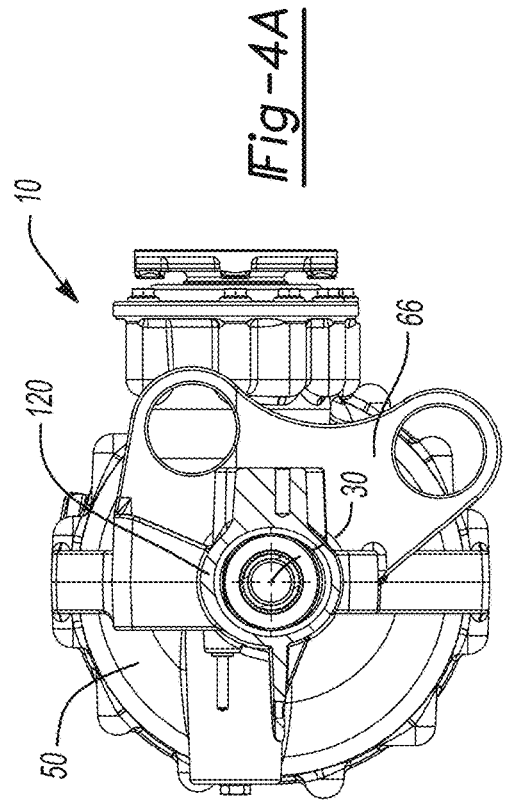
*Fig-4A*
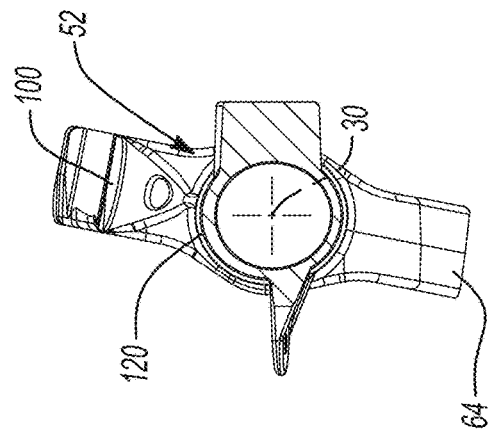
*Fig-4D*
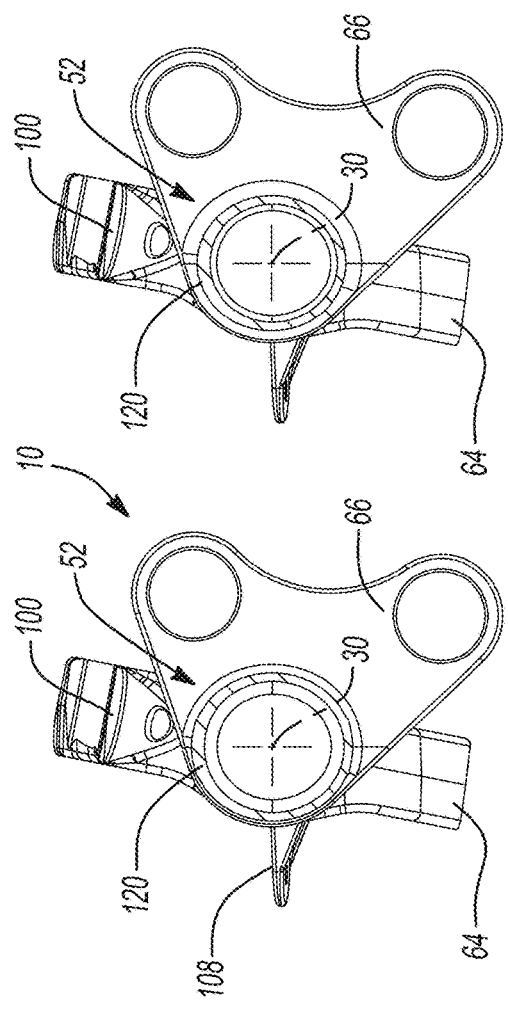
*Fig-4C*
*Fig-4B*

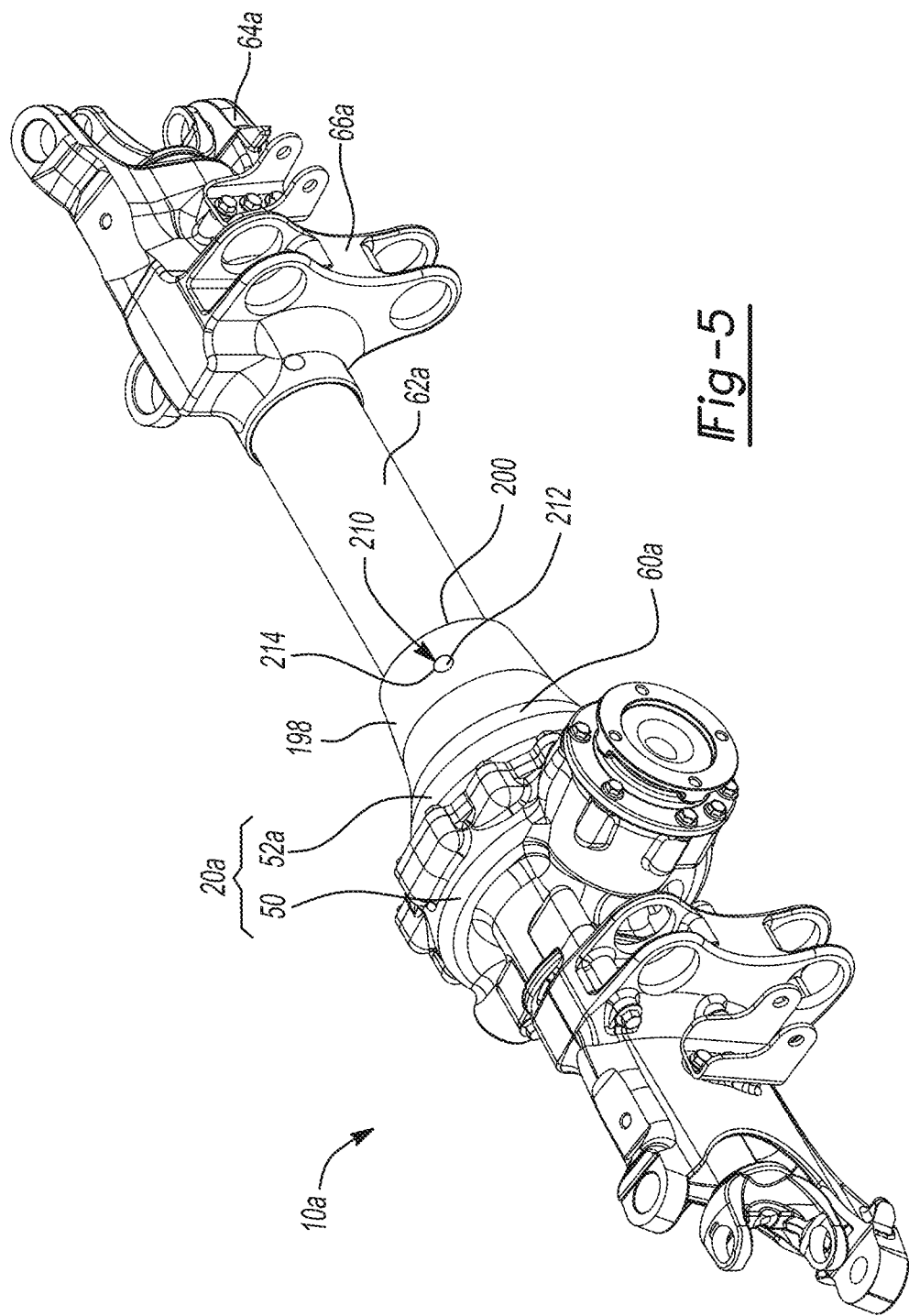

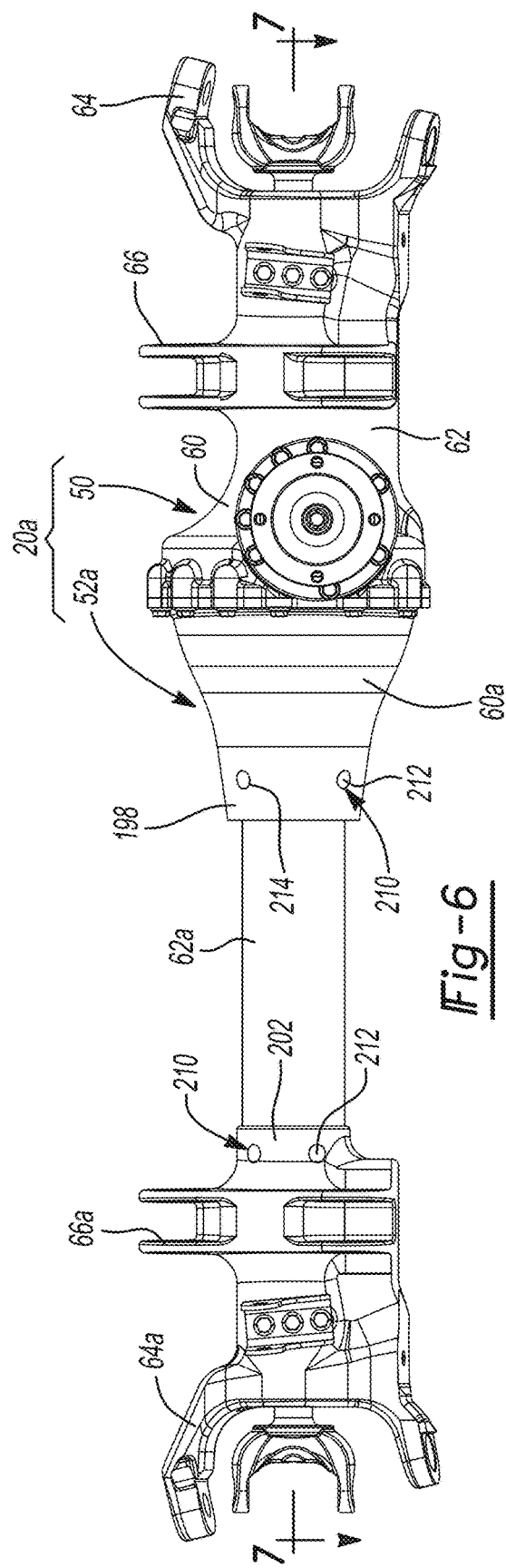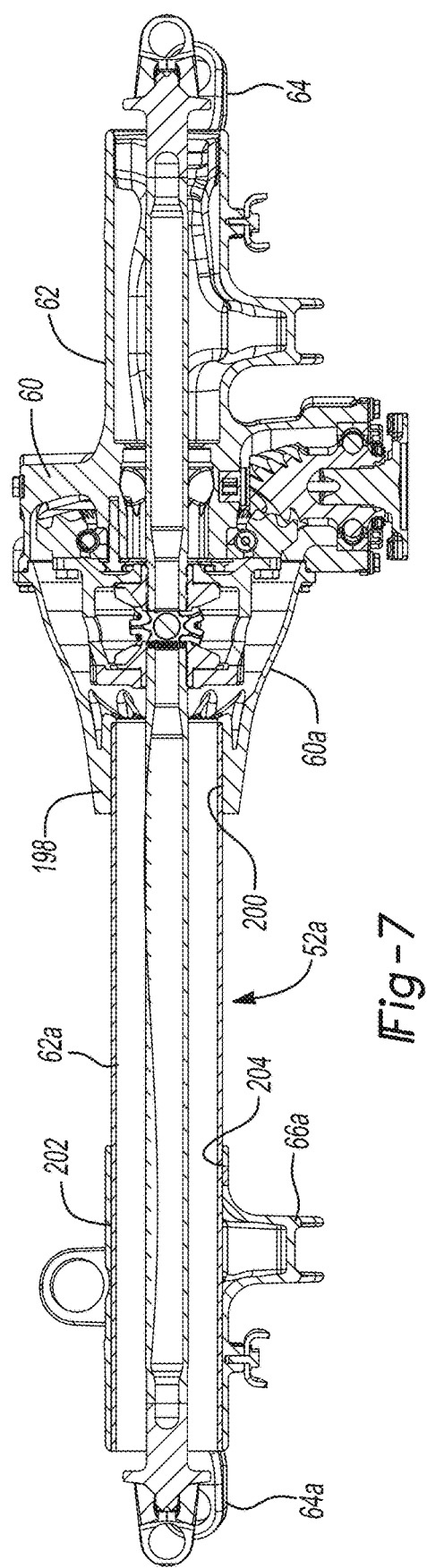

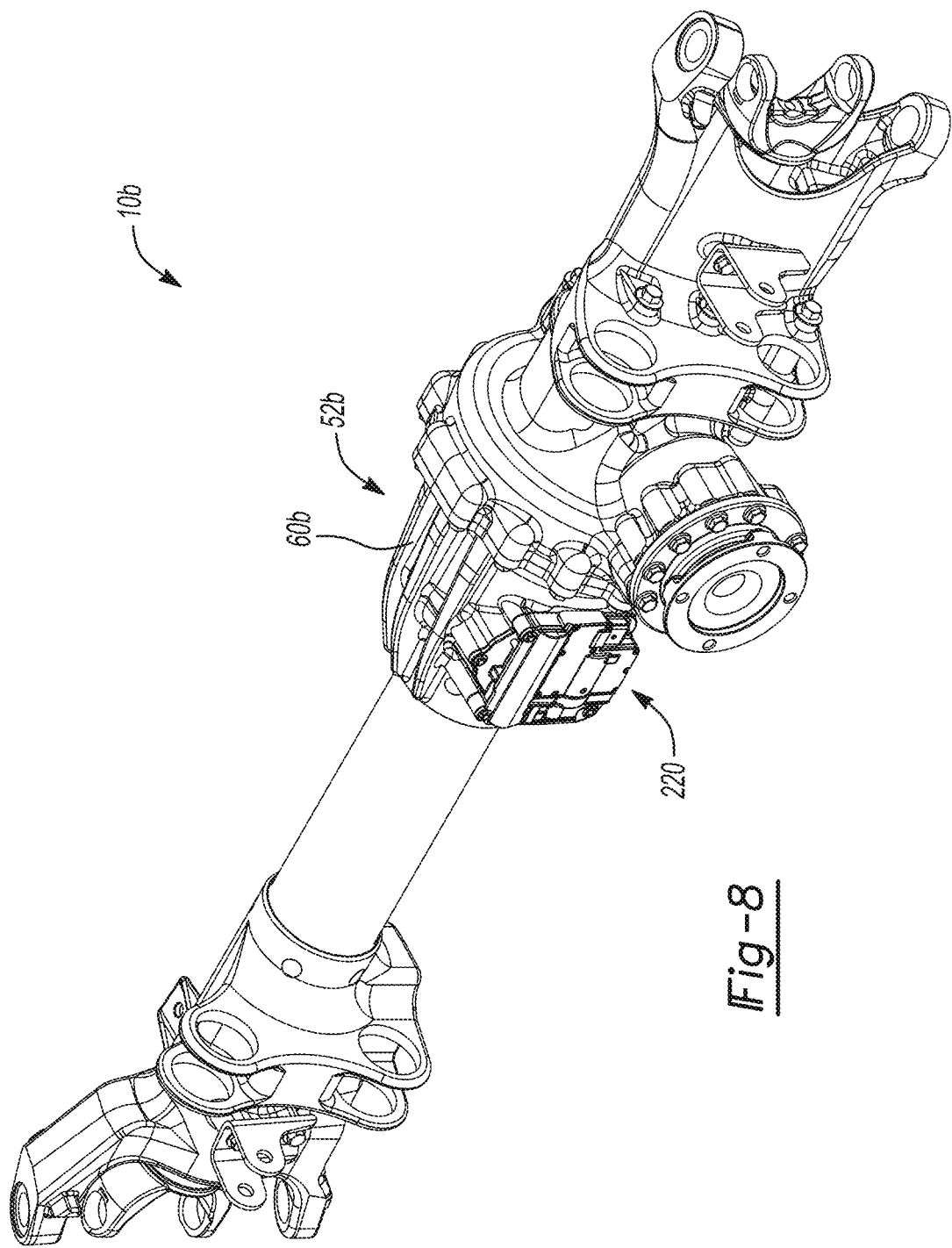

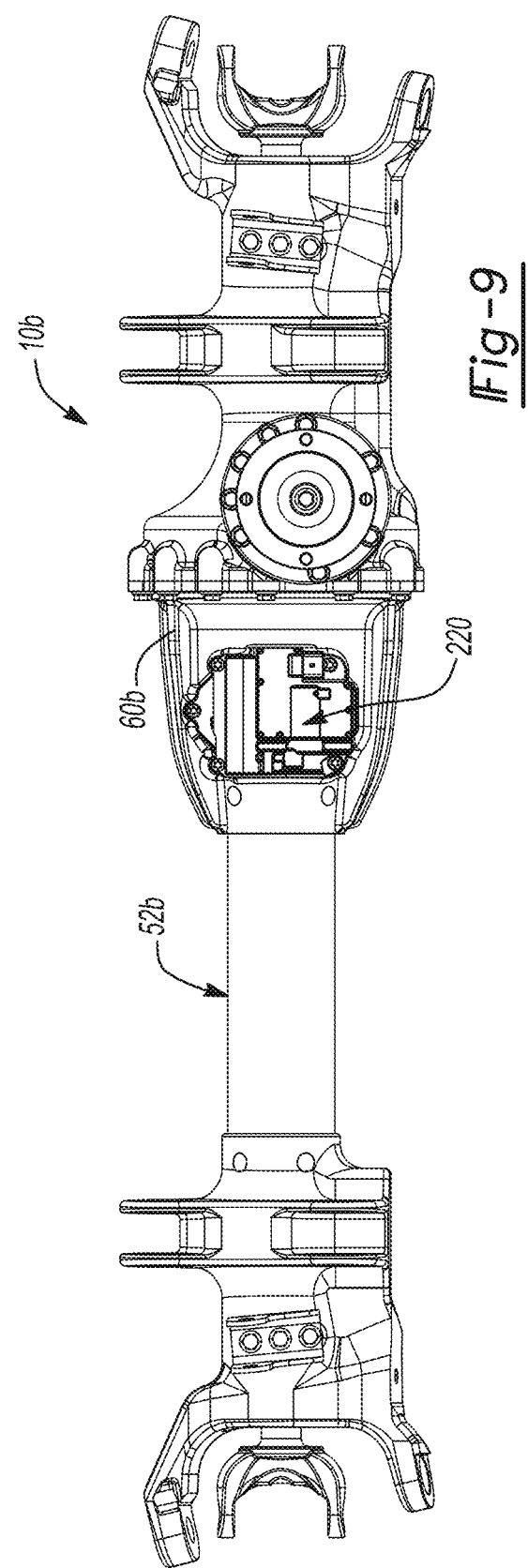

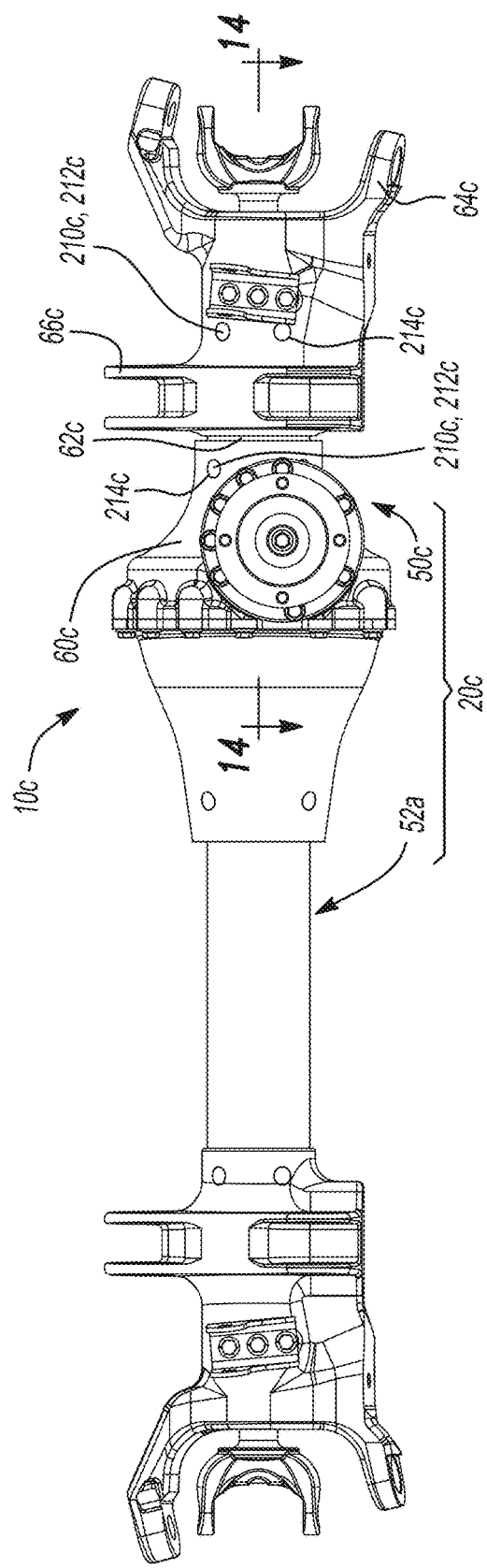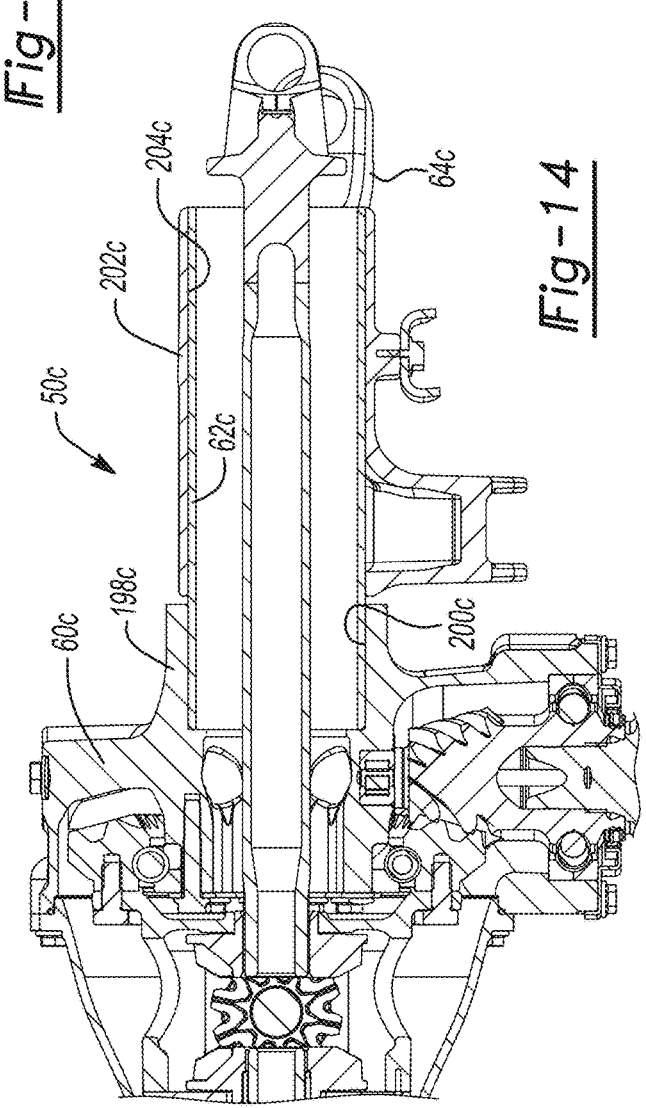

FRONT AXLE ASSEMBLY

CROSS-REFERENCE TO RELATED APPLICATIONS

This application is a U.S. National Phase Application under 35 U.S.C. 371 of International Application No. PCT/US2018/052595 filed on Sep. 25, 2018 and published in English as WO 2019/060881 A1 on Mar. 28, 2019, which claims the benefit of U.S. Provisional Application No. 62/562,567, filed on Sep. 25, 2017. The entire disclosures of both of the above applications are incorporated herein by reference.

FIELD

The present disclosure relates to a front axle assembly.

BACKGROUND

This section provides background information related to the present disclosure which is not necessarily prior art.

U.S. Pat. No. 5,664,847 discloses a front axle assembly having a Salisbury-type axle housing assembly in which a pair of axle tubes is received into a carrier or differential housing. The axle tube is a casting that includes a king pin yoke member and various brackets. While this arrangement is suited for its intended purpose, it is relatively heavy. Consequently, there is a need in the art for an improved front axle assembly.

SUMMARY

This section provides a general summary of the disclosure, and is not a comprehensive disclosure of its full scope or all of its features.

In one form, the present disclosure provides a front axle assembly having first and second output members, which are disposed for rotation about a rotary axis, a mechanism that provides speed differentiation between the first and second output members, and an axle housing. The axle housing has first and second housing halves that each include a main housing portion, a tubular portion and a steering yoke. Each of the main housing portions define a cavity that houses at least a portion of the speed differentiation mechanism. Each of the tubular portions is fixedly coupled to an associated one of the main housing portions and extends between the main housing portion and an associated one of the steering yokes. Each steering yoke is fixedly coupled to an associated tubular portion. An annular joint structure is formed where the first and second first housing halves are coupled to one another. The annular joint structure is formed about the rotary axis such that one of the first and second housing halves is inserted into the other one of the first and second housing halves along an insertion axis that is coincident with the rotary axis.

In another form, the present disclosure provides a vehicle driveline component that includes a differential case, a differential gearset, a coupler and a carrier member. The differential case defines an internal cavity and is rotatable about an axis. The differential gearset is received in the internal cavity and has first and second side gears. The coupler is received in the internal cavity and is configured to non-rotatably engage a shaft. The carrier member is received in the internal cavity and is movable along the axis between a first position, a second position and a third position. The coupler is rotationally decoupled from both the differential case and the first side gear when the carrier member is disposed in the first position. The coupler and the first side gear are rotationally coupled and the differential case is not rotationally coupled to either of the coupler and the first side gear when the carrier member is disposed in the second position. The differential case, the first side gear and the coupler are rotationally coupled when the carrier member is disposed in the third position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4A through 4D are section views taken along respective lines shown in FIG. 3;

FIG. 5 is a perspective view of a second front axle assembly constructed in accordance with the teachings of the present disclosure;

FIG. 6 is a rear elevation view of the front axle assembly of FIG. 5;

FIG. 7 is a section view taken along the line 7-7 of FIG. 6;

FIG. 8 is a perspective view of a third front axle assembly constructed in accordance with the teachings of the present disclosure;

FIG. 9 is a rear elevation view of the front axle assembly of FIG. 8;

FIG. 13 is a rear elevation view of a fourth front axle assembly constructed in accordance with the teachings of the present disclosure;

FIG. 14 is a section view taken along the line 14-14 of FIG. 13;

Corresponding reference numerals indicate corresponding parts throughout the several views of the drawings.

DETAILED DESCRIPTION

Figure 1A:
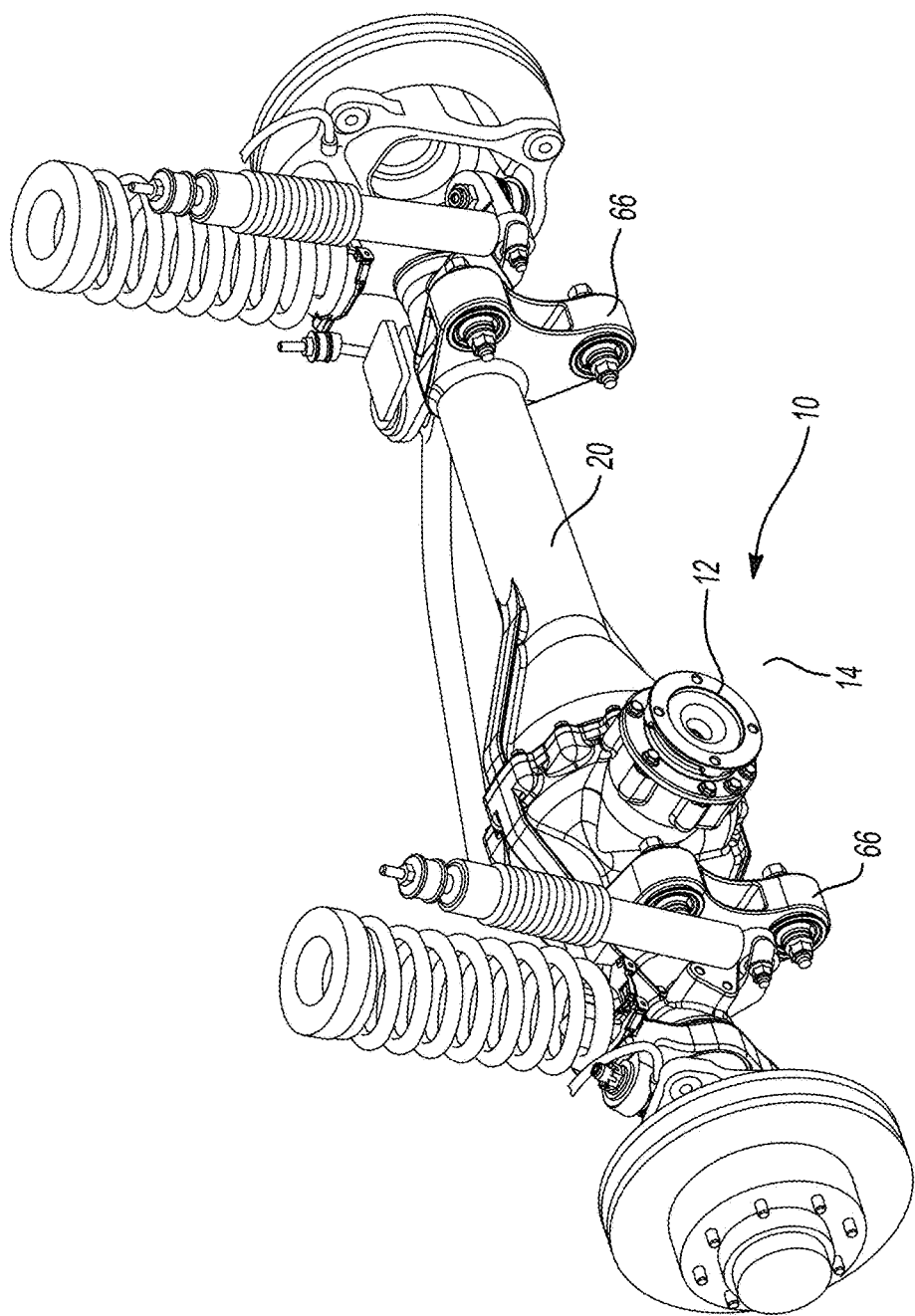
FIG. 1A is a rear perspective view of a portion of a vehicle having an exemplary front axle assembly constructed in accordance with the teachings of the present disclosure.
Figure 1B:
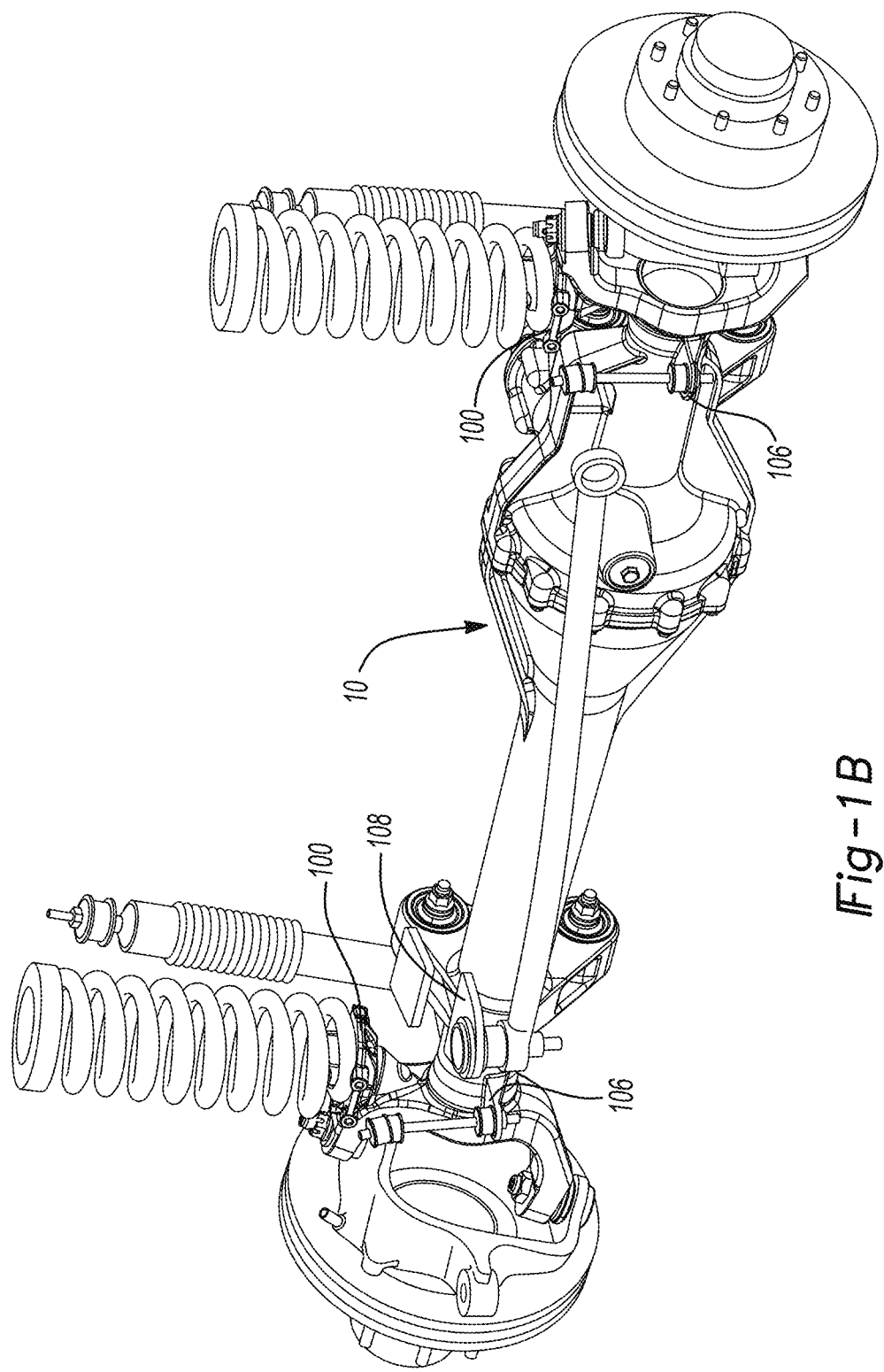
FIG. 1B is a front perspective view of the portion of the vehicle depicted in FIG. 1A.

In FIGS. 1A and 1B, a portion of a vehicle is shown to include a front axle assembly 10 constructed in accordance with the teachings of the present disclosure. Rotary power can be transmitted to an input pinion 12 of the front axle assembly 10 via a propshaft 14 (only partly shown). The front axle assembly 10 is configured to transmit rotary power to a pair of wheel hubs 16 that are pivotably mounted to the axle assembly 10.

Figure 2:
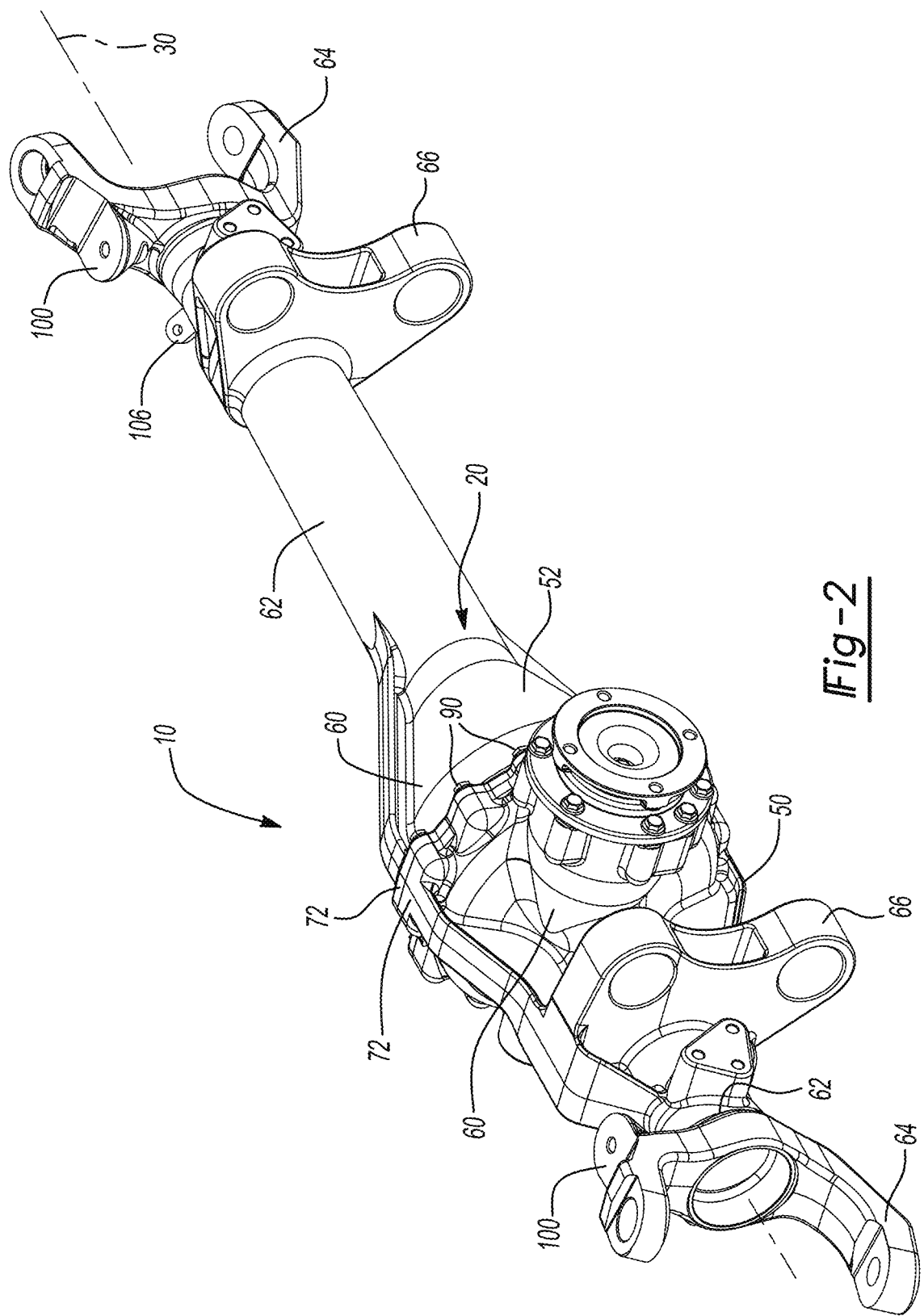
FIG. 2 is a perspective view of the front axle assembly of FIG. 1A.
Figure 3:
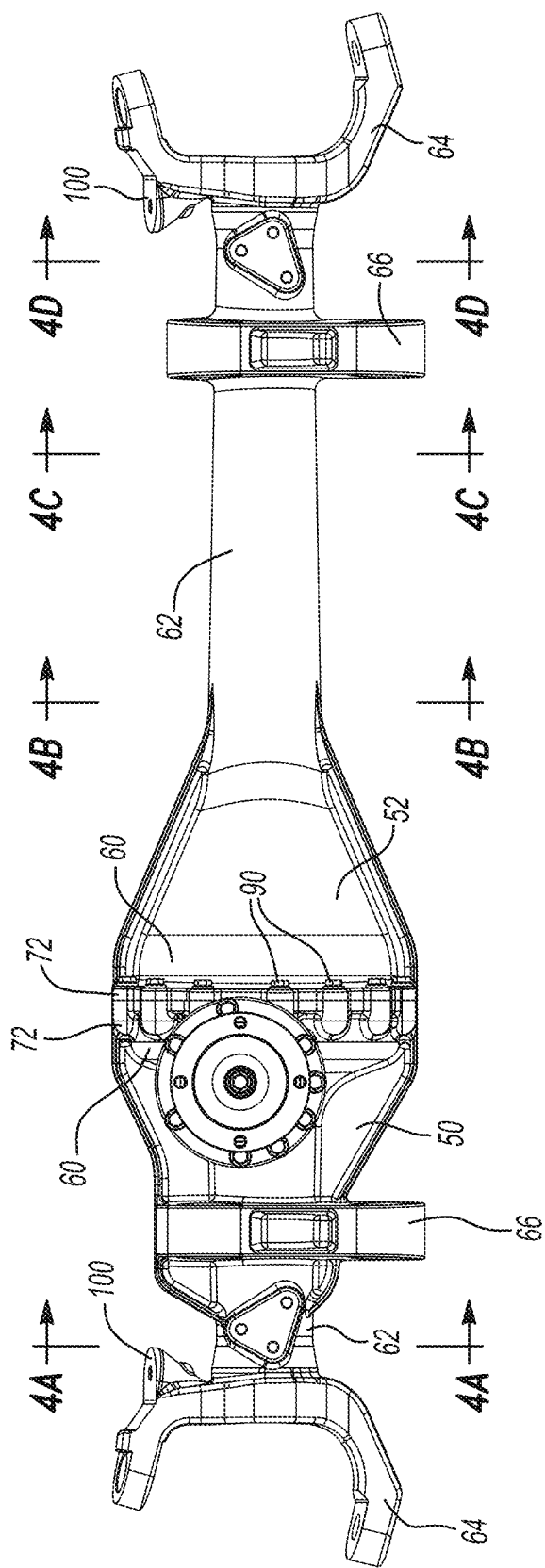
FIG. 3 is a lateral cross-sectional view of the front axle assembly of FIG. 1A.
Figure 3A:
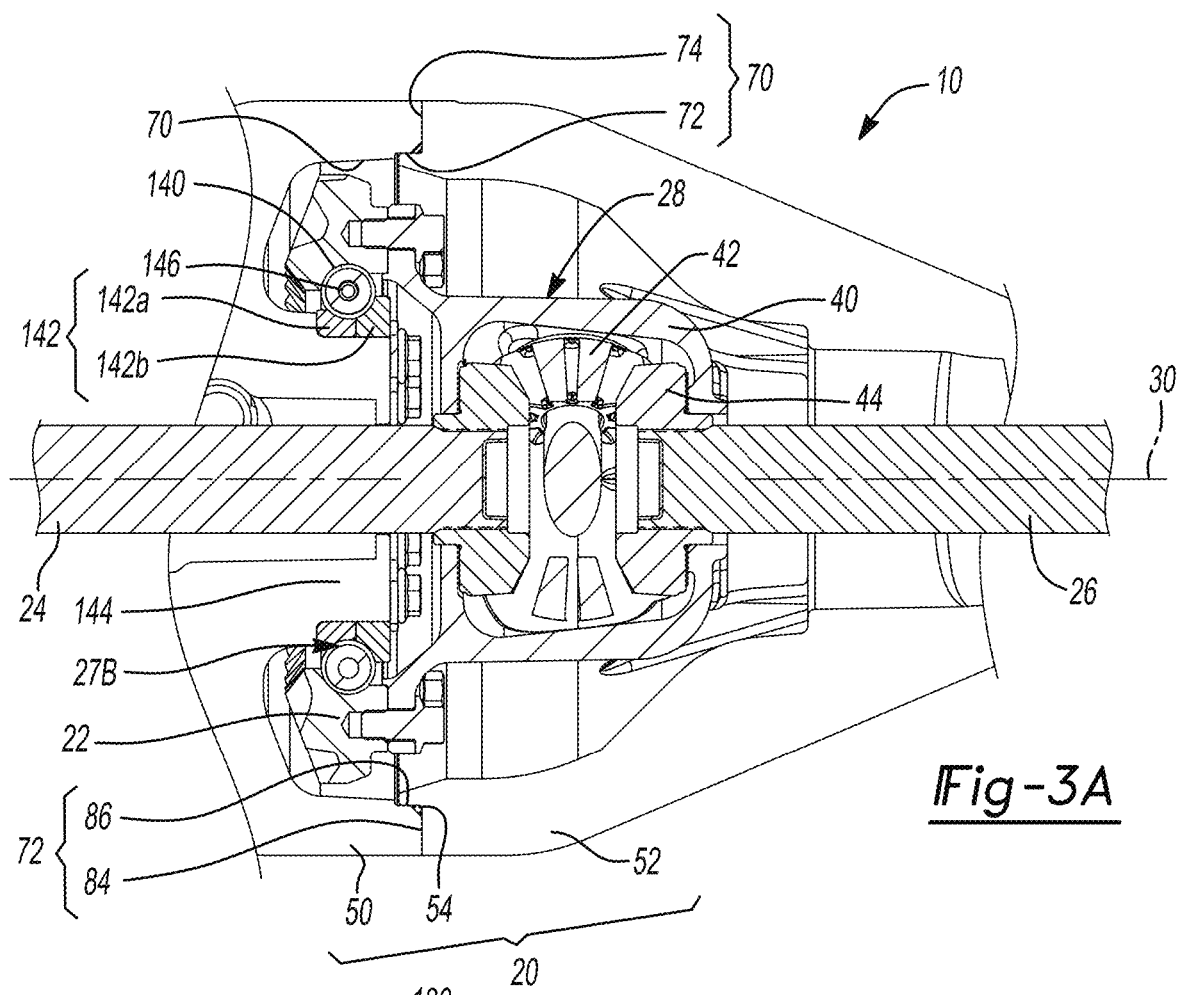
FIG. 3A is an enlarged portion of FIG. 3.
Figure 3B:
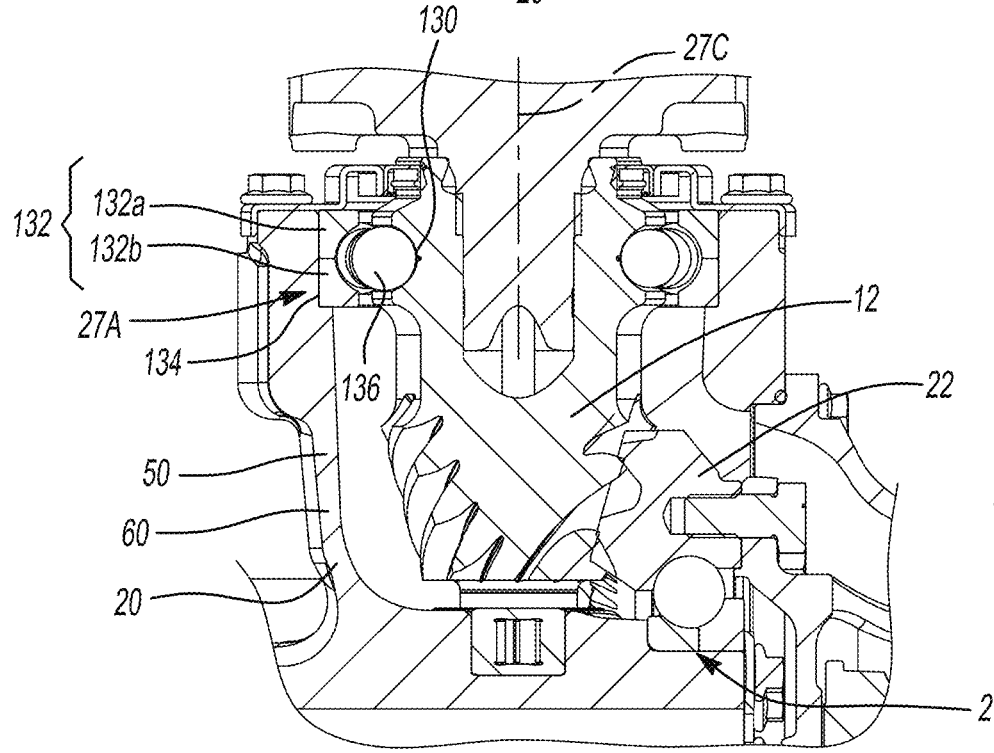
FIG. 3B is a cross-sectional view of a portion of the front axle assembly of FIG. 1A, the view illustrating an input pinion and input pinion bearing in more detail.

With reference to FIGS. 2 through 3B, the axle assembly 10 can further include a housing assembly 20, a ring gear 22, first and second output members 24 and 26, means 28 for permitting speed differentiation between the first and second output members 24 and 26, an input pinion bearing 27A and a ring gear bearing 27B. It will be appreciated that the input pinion 12 is rotatable about a pinion axis 27C and can mesh with the ring gear 22 to drive the ring gear 22 about a rotary axis 30, and that the speed differentiation means 28 can be employed to transmit rotary power from the ring gear 22 to the first and second output members 24 and 26 to drive the first and second output members 24 and 26 about the rotary axis 30.

With specific reference to FIG. 3A, the speed differentiation means 28 can comprise an open differential that employs a differential case 40, which is coupled to the ring gear 22 for rotation therewith, a plurality of pinion gears 42 and a plurality of side gears 44. Each of the pinion gears 42 can be mounted to the differential case 40 for rotation about an associated axis that is perpendicular to the rotary axis 30. The pinion gears 42 can meshingly engage both of the side gears 44, each of which being non-rotatably coupled to an associated one of the first and second output members 24 and 26. However, it will be appreciated that the speed differentiation means 28 could be configured in a manner that limits speed differentiation between the first and second output members 24 and 26, and/or is configured to selectively inhibit speed differentiation between the first and second output members 24 and 26. Moreover, while the speed differentiation means 28 is illustrated as employing straight bevel gears (i.e., for the pinion gears 42 and the side gears 44), it will be appreciated that it could employ other types of gearing, such as helical gearing (i.e., in which pairs of the pinion gears are meshed together and each pinion gear is disposed parallel to the rotary axis 30 and meshed with a single one of the side gears), or could incorporate one or more clutches (e.g., friction clutches).

Returning to FIGS. 2 through 3A, the housing assembly 20 can comprise first and second housing halves 50 and 52 and a seal or gasket 54 that can be employed to seal a joint between the first and second housing halves 50 and 52. Each of the first and second housing halves 50 and 52 can include a main housing portion 60, a tubular portion 62, a steering yoke 64 and an isolator mount 66.

The main housing portion 60 can define a cavity 70, which can house at least a portion of the speed differentiation means 28, and an annular joint structure 72. The joint structures 72 of the first and second housing halves 50 and 52 are configured to couple to one another to thereby fixedly couple the main housing portions 60 to one another. In the example provided, the joint structure 72 of the first housing half 50 defines a first axial end face 74 and an internal bore 76, while the joint structure 72 of the second housing half 52 defines a second axial end face 84 and an annular projection 86 that is received into engagement with the internal surface of the internal bore 76. The seal or gasket 54 can be disposed between the joint structures 72 of the first and second housing halves 50 and 52 to thereby seal the interface between the joint structures 72. In the example provided, the seal or gasket 54 comprises an elastomeric seal member that is disposed in a seal groove formed about the annular projection 86 and sealingly engaged to the internal surface of the internal bore 76. As is best shown in FIG. 2, threaded fasteners 90 can be received through apertures (not shown) in one of the joint structures 72 (e.g., the joint structure 72 associated the second housing half 52) and threaded into threaded holes (not shown) formed in the other one of the joint structures 72 (e.g., the joint structure 72 associated with the first housing half 50). It will be appreciated that the joint structures 72 form an annular joint that is formed about the rotary axis 30 such that one of the first and second housing halves 50 and 52 is inserted into the other one of the first and second housing halves 50 and 52 along an insertion axis that is coincident with the rotary axis 30.

With reference to FIG. 3B, the input pinion bearing 27A can be mounted to the main housing portion 60 of the first housing half 50 and the input pinion 12. The input pinion bearing 27A can support the input pinion 12 for rotation about a pinion axis 27C relative to the housing assembly 20 and is configured to transmit thrust loads between the main housing portion 60 of the first housing half 50 and the input pinion 12 in both axial directions along the pinion axis 27C. In the example provided, the input pinion bearing 27A is a four-point angular contact bearing having an inner race 130, which is integrally and unitarily formed with the input pinion 12, and an outer bearing race 132 that is formed as two discrete race members 132a and 132b. The race members 132a and 132b are received into a bearing bore 134 formed in the main housing portion 60 of the first housing half 50. It will be appreciated, however, that the input pinion bearing 27A could be formed somewhat differently. In this regard, the inner bearing race 130 could be partly formed (unitarily and integrally) with the input pinion 12 and a race member (not shown) could be assembled to the input pinion 12 to complete the inner bearing race 130. Moreover, while the input pinion bearing 27A has been illustrated as having spherically shaped bearing elements 136 that are disposed between the inner and outer bearing races 130 and 132, the bearing elements 136 could be formed with a different shape.

With reference to FIG. 3A, the ring gear bearing 27B can be mounted to the housing assembly 20 and the ring gear 22. The ring gear bearing 27B can support the ring gear 22 for rotation about the rotary axis 30 relative to the housing assembly 20 and is configured to transmit thrust loads between the housing assembly 20 and the ring gear 22 in both axial directions along the rotary axis 30. In the example provided, the ring gear bearing 27B is a four-point angular contact bearing having an outer race 140, which is integrally and unitarily formed with the ring gear 22, and an inner bearing race 142 that is formed as two discrete bearing members 142a and 142b that are mounted on a hollow hub 144 formed on the main housing portion 60 of the first housing half 50. The ring gear 22 is disposed about the hub 144 such that the ring gear bearing 27B is disposed radially inwardly of the ring gear 22. It will be appreciated, however, that the ring gear bearing 27B could be formed somewhat differently. In this regard, the outer bearing race 140 could be coupled to the housing assembly 20 (e.g., the main housing portion 60 of the first housing half 50) and the inner bearing race 142 could be coupled to the ring gear 22 (e.g., assembled to or unitarily and integrally formed with the ring gear 22). Moreover, the bearing race that is associated with the ring gear 22 could include a race member (not shown) that is assembled to the ring gear 22 so that the bearing race that is associated with the ring gear 22 is only partly unitarily and integrally formed with the ring gear 22. Moreover, while the ring gear bearing 27B has been illustrated as having spherically shaped bearing elements 146 that are disposed between the outer and inner bearing races 140 and 142, the bearing elements 146 could be formed with a different shape.

Returning to FIGS. 2 through 3A, each tubular portion 62 can be fixedly coupled to an associated one of the main housing portions 60 and can extend between the associated one of the main housing portions 60 and an associated one of the steering yokes 64. The tubular portions 62 are sized to receive therein an associated one of the first and second output members 24 and 26. Each of the steering yokes 64 and each of the isolator mounts 66 can be fixedly coupled to a corresponding one of the tubular portions 62. The main housing portion 60, the tubular portion 62 and the steering yoke 64 of at least one of the first and second housing halves 50 and 52 can be integrally and unitarily formed as a casting.

Each of the first and second housing halves 50 and 52 can include various brackets and/or mounts as desired. In the example provided, each of the tubular portions 62 comprises a spring seat 100 and a stabilizer bar bracket 106, but it will be appreciated that one or both of the tubular portions 62 could comprise an upper control arm bracket (not shown), a lower control arm bracket (not shown), an upper drag link bracket 108 (FIG. 1B), and/or various mounts (not shown) that can be employed as attachment points for various clips, clamps, sensors and other hardware, including shock absorbers.

With specific reference to FIGS. 4A through 4D, the tubular portion 62 of the at least one of the first and second housing halves 50 and 52 can have a circumferentially extending wall member 120. If desired, the wall member 120 can be configured to have a thickness that is not uniform about its circumference. FIGS. 4A through 4D illustrate cross-sections taken through the wall member 120 of the tubular portions 62 of the first and second housing halves 50 and 52. Each of the cross-sections is taken through an associated one of the wall members 120 in a corresponding plane that is perpendicular to the rotary axis 30. The thickness of the wall members 120 shown in each of the cross-sections is thickest where the wall member 120 forms a portion of a top surface of the front axle assembly 10 (the top surface is the vertically upper surface of the front axle assembly 10 when the front axle assembly 10 is positioned in its working orientation). Construction in this manner can be advantageous to strengthen the beam loading capacity of the housing assembly 20 in a manner that adds relatively little weight.

With reference to FIGS. 5 through 7, a second front axle assembly constructed in accordance with the teachings of the present disclosure is generally indicated by reference numeral 10a. The front axle assembly 10a is generally similar to the front axle assembly of FIG. 2 except for the construction of the housing assembly 20a. More specifically, the housing assembly 20a includes a second housing half 52a having a main housing portion 60a, a tubular portion 62a and a steering yoke 64a that are formed as discrete components that are subsequently assembled together. In the particular example provided, the isolator mount 66a is unitarily and integrally formed with the steering yoke 64a, but it will be appreciated that the isolator mount 66a could be formed as a discrete component and assembled to the steering yoke 64a in a desired manner, such as welding.

The main housing portion 60a of the second housing half 50a can have a first socket 198 that can define a first tube aperture 200, while the steering yoke 64a can have a second socket 202 that can define a second tube aperture 204. The tubular portion 62a can be formed as a hollow tube that can have an annular wall member. The width of the wall member can be sized in a desired manner and may be constant over the circumference and length of the tubular portion 62a, or could vary in a desired manner around its circumference and/or over its length. The opposite ends of the tubular portion 62a can be coupled to the main housing portion 60a and the steering yoke 64a in any desired manner. In the example provided, the opposite ends of the tubular portion 62a are received into the first and second sockets 198 and 202 and engage the first and second tube apertures 200 and 204, respectively, over desired distances with an interference fit. Configuration in this manner helps the tubular portion 62a to efficiently transmit bending loads between the steering yoke 64a and the main housing portion 60a, as well as to help seal the interface between the tubular portion 62a and the main housing portion 60a and the interface between the tubular portion 62a and the steering yoke 64a. In the example provided, the first end of the tubular portion 62a is received into the first tube aperture 200 and seated against a machined surface in the first socket 198 such that the tubular portion 62a is engaged to the main housing portion 60a over a predetermined distance, while the second end of the tubular portion 62a is received fully through the steering yoke 64a so that the tubular portion 62a is engaged to the steering yoke 64a over the entire length of the steering yoke 64a.

Additionally or alternatively, one or both ends of the tubular portion 62a can be welded to the main housing portion 60a and/or the steering yoke 64a. In the example provided, welds are employed to secure both ends of the tubular portion 62a to the main housing portion 60a and the steering yoke 64a. Each of the welds can comprise a plurality of slug welds 210 in which a slug 212 is received into a slug aperture 214, which is formed through an associated one of the first and second sockets 198 and 202, and abutted against an outer surface of the tubular portion 62a. The slug 212 is at least partly melted to create a bond that fixedly couples the slug 212 to the tubular portion 62a to inhibit rotation or axial movement of the tubular portion 62a relative to an associated one of the main housing portion 60a and the steering yoke 64a. It will be appreciated that other types of welds besides slug welds could be employed to secure the tubular portion 62a to another component (such as the main housing portion 60a), including puddle welds.

Construction of the front axle assembly 10a in this manner provides a modular solution in which the main housing portion 60a can be utilized over a number of different front axle assemblies, permits the spacing between the main housing portion 60a and the steering yoke 64a to be easily varied (i.e., by changing the length of the tubular portion 62a) and permits changes to be made to the steering yoke 64a and/or the isolator mounts 66a in a more cost-effective manner. Construction in this manner also permits the main housing portion 60a, the tubular portion 62a and the steering yoke 64a to be made from desired materials that are selected based on their weight, cost, strength and manufacturability. For example, the main housing portion 60a can be formed of cast iron or aluminum, the tubular portion 62a can be formed of steel, and the steering yoke 64a can be formed of cast iron.

Figure 10:
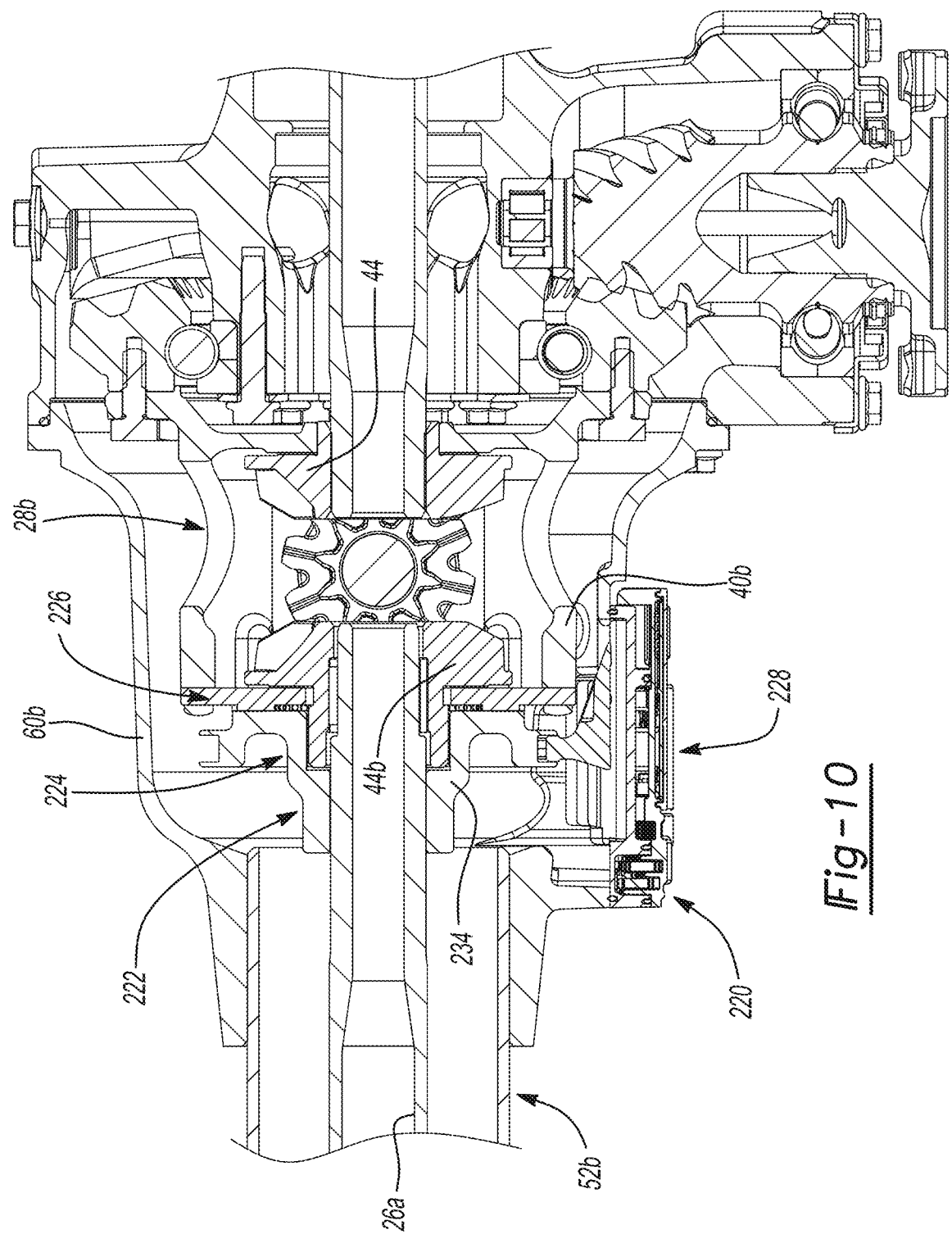
FIG. 10 is a section view taken along the line 10-10 of FIG. 9.

With reference to FIGS. 8 through 10, a third front axle assembly constructed in accordance with the teachings of the present disclosure is generally indicated by reference numeral 10b. The front axle assembly 10b is generally similar to the front axle assembly 10a of FIG. 6 except that the front axle assembly 10a includes a multi-mode actuator assembly 220 that permits the front axle assembly 10a to operate in an open differentiating mode, a locked (non-differentiating) mode and a disconnected mode. The multi-mode actuator assembly 220 includes a first coupling 222, a second or disconnect coupling 224, a third or lock coupling 226 and an actuator 228.

Figure 11:
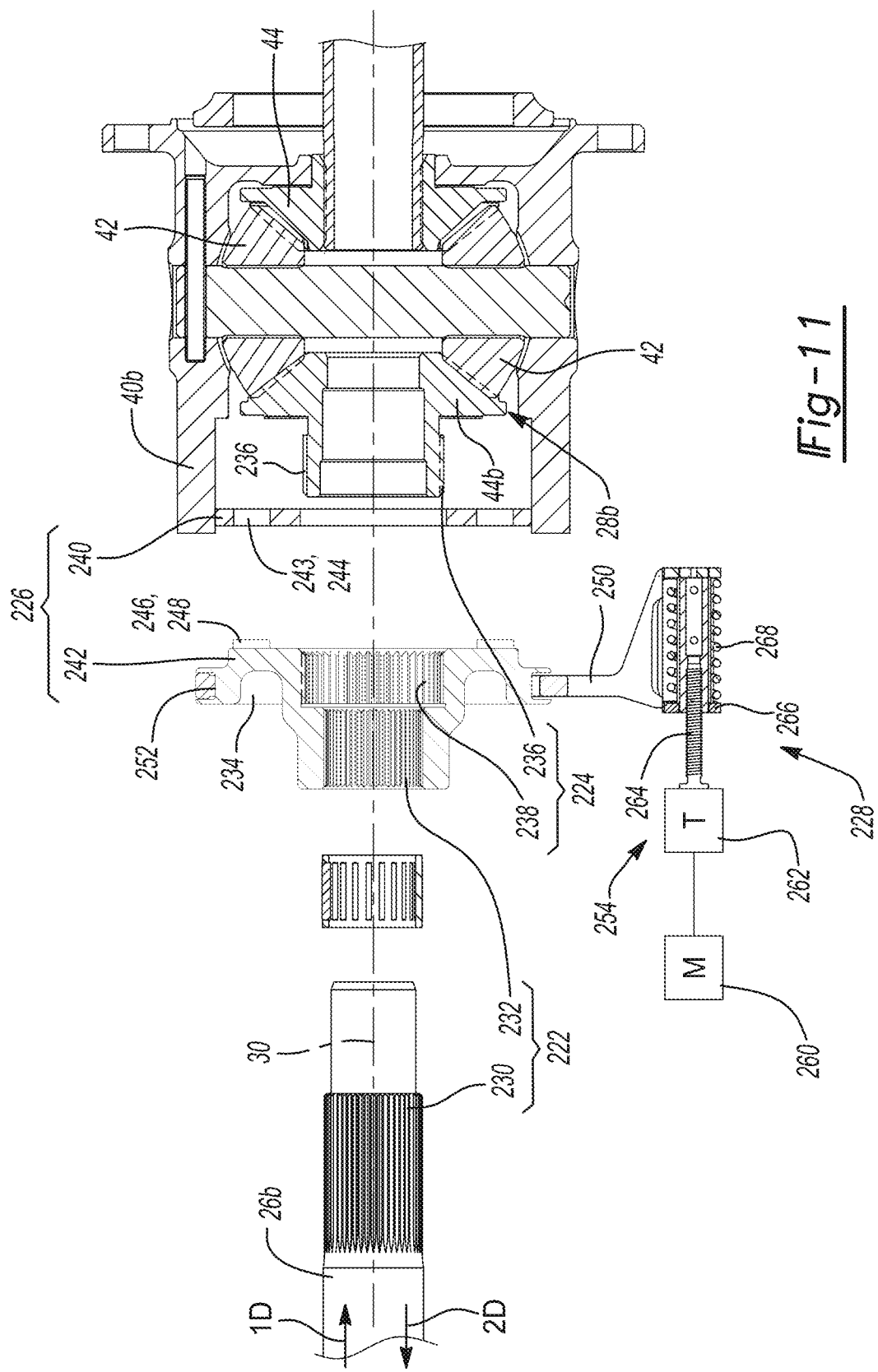
FIG. 11 is a partly sectioned exploded perspective view of a portion of the front axle assembly FIG. 8, the view illustrating a multi-mode actuator in more detail.

In FIG. 11, the first coupling 222 can include a first male splined segment 230, which can be formed on the second output member 26b, and a first female splined segment 232 can be formed on a carrier member 234. The first male splined segment 230 is received into and engaged with the first female splined segment 232 to thereby rotatably couple the carrier member 234 and the second output member 26b and permit the carrier member 234 to translate on the second output member 26b along the rotary axis 30. The second coupling 224 can include a second male splined segment 236, which can be formed on an output member of the speed differentiation means 28b, and a second female splined segment 238 that can be formed on the carrier member 234. The carrier member 234 is movable along the rotary axis 30 between a first position, in which the second female splined segment 238 is disengaged from the second male splined segment 236 on the output member of the speed differentiation means 28b, and second and third positions in which the second female splined segment 238 is engaged to the second male splined segment 236. It will be appreciated that engagement of the second female splined segment 238 to the second male splined segment 236 non-rotatably but axially slidably couples the carrier member 234 to the output member of the speed differentiation means 28b.

The third coupling 226 is employed to selectively couple the carrier member 234 to an input of the speed differentiation means 28b. It will be appreciated that the third coupling 226 could comprise mating male and female splined segments that are configured in a manner that is similar to that of the first and second couplings 222 and 224. In this regard, a male or female spline segment on the carrier member 234 can be selectively engaged to a female or male splined segment that is rotatably coupled to the input member of the speed differentiation means 28b. In the example provided, however, the third coupling 226 is a dog clutch having a first dog member 240 that is rotatably coupled to the input member of the speed differentiation means 28b, and a second dog member 242 that is rotatably coupled to the carrier member 234. The first dog member 240 can define a plurality of first engagement features 243, such as apertures 244, while the second dog member 242 can define a plurality of second engagement features 246, such as teeth 248. The second engagement features 246 are disengaged from the first engagement features 243 when the carrier member 234 is disposed in the first and second positions, but are engaged to the first engagement features 243 when the carrier member 234 is disposed in the third position.

In the example provided, the speed differentiation means 28b has a differential case 40b, a bevel pinion gears 42, a first side gear 44 and a second side gear 44b. Accordingly, the differential case 40b is the input of the speed differentiation means 28b, and the second male splined segment 236 is formed on the side gear 44b, which is an output of the speed differentiation means 28b. The second dog member 242 can be a plate-like structure that can be fixedly coupled to the differential case 40b. If desired, the second dog member 242 can close an end of the differential case 40b.

The actuator 228 can be mounted to an exterior surface on the main housing portion 60b (FIG. 8) of the second housing half 52b (FIG. 8). The actuator 228 can comprise any means for translating the carrier member 234 between its three positions. In the example provided, the actuator comprises a fork 250, which can be received into a circumferentially extending groove 252 that is formed in the carrier member 234, and a linear motor 254 that is configured to translate the fork 250 along the rotary axis 30. The linear motor 254 can comprise one or more solenoids or one or more pistons, for example. In the example provided, the linear motor 254 is similar to that which is described in U.S. Pat. No. 9,500,237, which is incorporated by reference, and includes an electric motor 260, a transmission 262, a lead screw 264, a carriage assembly 266 and a spring 268. Rotary power produced by the electric motor 260 is transmitted through the transmission 262 to the lead screw 264 to cause the lead screw 264 to rotate about its axis. The carriage assembly 266 is threadably engaged to the lead screw 264 and is employed to drive the fork 250 in first and second directions along the rotary axis 30. The spring 268 is a helical compression spring and is disposed between the carriage assembly 266 and the fork 250. The spring 268 can compress between the carriage assembly 266 and the fork 250 to permit the carriage assembly 266 to be translated in the first direction (arrow 1D) along the rotary axis 30 when the carrier member 234 is prevented from moving from the first position into the second position due to non-alignment between the second female splined segment 238 and the second male splined segment 236, or from the second position into the third position due to non-alignment between the first and second engagement features 243 and 246. The carriage assembly 266 can contact the fork 250 directly when the carrier member 234 is moved in the second direction (arrow 2D) along the rotary axis 30 (i.e., toward the first position).

Placement of the carrier member 234 in the first position rotationally decouples the second output member 26b from both the output (i.e., side gear 44b) and the input (differential case 40b) of the speed differentiation means 28b and consequently, rotary power is not transmitted between the speed differentiation means 28d and the second output member 26b. With the front axle assembly 20b in this disconnected state, a vehicle equipped with the front axle assembly 20b could be operated in a rear-wheel drive mode.

Placement of the carrier member 234 in the second position engages the second female splined segment 238 to the second male splined segment 236 to permit rotary power to be transmitted between the side gear 44b and the second output member 26b so that the speed differentiation means 28b operates as an open differential (i.e., a differential that permits unregulated speed differentiation between the first and second output members 24 and 26b). In this mode, a vehicle equipped with the front axle assembly 20b could be operated in a four-wheel drive mode.

Placement of the carrier member 234 in the third position additionally engages the second engagement features 246 of the second dog member 242 to the first engagement features 243 of the first dog member 240 to effectively rotationally couple the input member (e.g., differential case 40b) of the speed differentiation means 28b to the second output member 26*b*. This mode locks the speed differentiation means 28*b* to inhibit speed differentiation between the first and second output members 24 and 26*b*.

Figure 12:
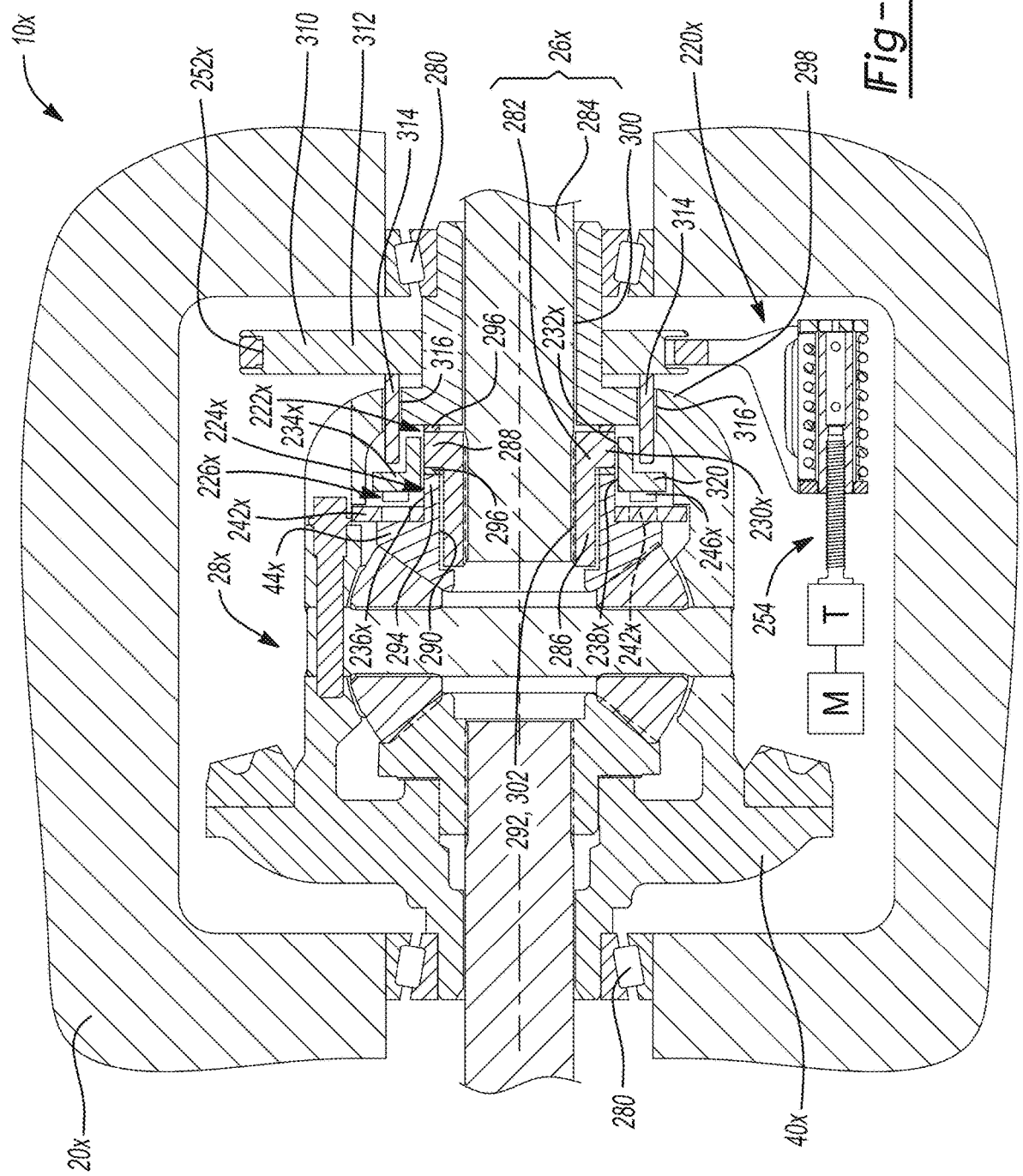
FIG. 12 is a section view of a portion of an alternately constructed axle assembly having a multi-function actuator assembly of the type that is employed in the example of FIG. 8.

While the multi-mode actuator assembly 220 has been illustrated and described herein in conjunction with the speed differentiation means of a front axle assembly, it will be appreciated that the multi-mode actuator assembly 220 could be employed in other vehicle driveline components, such as a center differential, a differential in a transfer case, or a rear axle assembly. With reference to FIG. 12, the multi-mode actuator assembly 220*x* is depicted in a more conventionally configured axle assembly 10*x* in which the input member of the speed differentiation means 28*x* is a differential case 40*x* that is supported for rotation relative to an axle housing 20*x* via a pair of bearings 280, which can be tapered roller bearings.

The differential output member is a side gear 44*x* in this example, while the output member 26*x* includes a coupler 282 and a shaft 284. The coupler 282 has a coupler body 286 and a flange 288 that extends radially outwardly from the coupler body 286. The coupler body 286 is rotatably received in a bore 290 in the side gear 44*x* and has an internally splined aperture 292. The flange 288 includes the first male splined segment 230*x* of the first coupling 222*x*, while the hub 294*x* on the side gear 44*x* includes the second male splined segment 236*x* of the second coupling 224*x*. Thrust bearings 296 can be disposed between the axial end 298 of the differential case 40*x* and the coupler 282, and/or between the flange 288 on the coupler 282 and the hub 294 of the side gear 44*x*. The shaft 284 extends through a shaft aperture 300 in the differential case 40*x* and has a male splined segment 302 that is received into and engages with the female splined aperture 292 on the coupler 282. Accordingly, the coupler 282 and the shaft 284 are coupled for rotation. The carrier member 234*x* is received in the differential case 40*x* at a location between the axial end 298 of the differential case 40*x* and the second dog member 242*x*, which can be a plate-like structure that can be received in and fixedly coupled to the differential case 40*x*. The first and second female splined segments 232*x* and 238*x* that are formed on the carrier member 234*x* can coincide with one another so that each tooth of the first female splined segment 232*x* is unitarily and integrally formed with a corresponding tooth of the second female splined segment 238*x*.

The actuator 228*x* can include an apply plate 310 having an annular plate body 312 and a plurality of legs 314. The annular plate body 312 can be received about the differential case 40*x* in a location that is adjacent or proximate to the axial end 298 of the differential case 40*x*. Each of the legs 314 can be a cylindrically shaped pin that can be received through a corresponding leg aperture 316 formed through the axial end 298 of the differential case 40*x*. A first end of each leg 314 can be fixedly coupled to the annular plate body 312, and a second end of each leg 314 can abut a flange 320 on the carrier member 234*x* on a side that is opposite the second engagement features 246*x*. The actuator 228*x* can include any means for translating the apply plate 310, such as a fork 250 that is received into a circumferentially extending groove 252*x* formed in the apply plate 310 and a linear motor 254 for translating the fork 250.

Placement of the carrier member 234*x* in the first position so that the second female splined segment 238*x* is disengaged from the second male splined segment 236*x* and the second engagement features 246*x* on the second dog member 242*x* are disengaged from the first engagement features 243 on the first dog member 240*x* rotationally decouples the output member 26*x* from both the output (i.e., side gear 44*x*) and the input (differential case 40*x*) of the speed differentiation means 28*x* and consequently, rotary power is not transmitted between the speed differentiation means 28*x* and the output member 26*x*. Placement of the carrier member 234*x* in the second position engages the second female splined segment 238*x* to the second male splined segment 236*x* to permit rotary power to be transmitted between the side gear 44*x* and the output member 26*x* so that the speed differentiation means 28*x* operates as an open differential. Placement of the carrier member 234*x* in the third position additionally engages the second engagement features 246 of the second dog member 242 to the first engagement features 243 of the first dog member 240 to effectively rotationally couple the input member (e.g., differential case 40*x*) of the speed differentiation means 28*x* to the output member 26*x*.

With reference to FIGS. 13 and 14, a fourth front axle assembly constructed in accordance with the teachings of the present disclosure is generally indicated by reference numeral 10*c*. The front axle assembly 10*c* is generally similar to the front axle assembly 10*a* of FIG. 6 except for the construction of the housing assembly 20*c*. More specifically, the housing assembly 20*c* includes a first housing half 50*c* having a main housing portion 60*c*, a tubular portion 62*c* and a steering yoke 64*c* that are formed as discrete components that are subsequently assembled together. In the particular example provided, the isolator mount 66*c* is unitarily and integrally formed with the steering yoke 64*c*, but it will be appreciated that the isolator mount 66*c* could be formed as a discrete component and assembled to the steering yoke 64*c* in a desired manner, such as welding.

The main housing portion 60*c* of the first housing half 50*c* can have a first socket 198*c* that can define a first tube aperture 200*c*, while the steering yoke 64*c* can have a second socket 202*c* that can define a second tube aperture 204*c*. The tubular portion 62*c* can be formed as a hollow tube that can have an annular wall member. The width of the wall member can be sized in a desired manner and may be constant over the circumference and length of the tubular portion 62*c*, or could vary in a desired manner around its circumference and/or over its length. The opposite ends of the tubular portion 62*c* can be coupled to the main housing portion 60*c* and the steering yoke 64*c* in any desired manner. In the example provided, the opposite ends of the tubular portion 62*c* are received into the first and second sockets 198*c* and 202*c* and engage the first and second tube apertures 200*c* and 204*c*, respectively, with an interference fit. Additionally or alternatively, one or both ends of the tubular portion 62*c* can be welded to the main housing portion 60*c* and/or the steering yoke 64*c*. In the example provided, welds are employed to secure both ends of the tubular portion 62*c* to the main housing portion 60*c* and the steering yoke 64*c*. Each of the welds can comprise a plurality of slug welds 210*c* in which a slug 212*c* is received into a slug aperture 214*c*, which is formed through an associated one of the first and second sockets 198*c* and 202*c*, and abutted against an outer surface of the tubular portion 62*c*. The slug 212*c* is at least partly melted to create a bond that fixedly couples the slug 212*c* to the tubular portion 62*c* to inhibit rotation or axial movement of the tubular portion 62*c* relative to an associated one of the main housing portion 60*c* and the steering yoke 64*c*.

Figure 15:
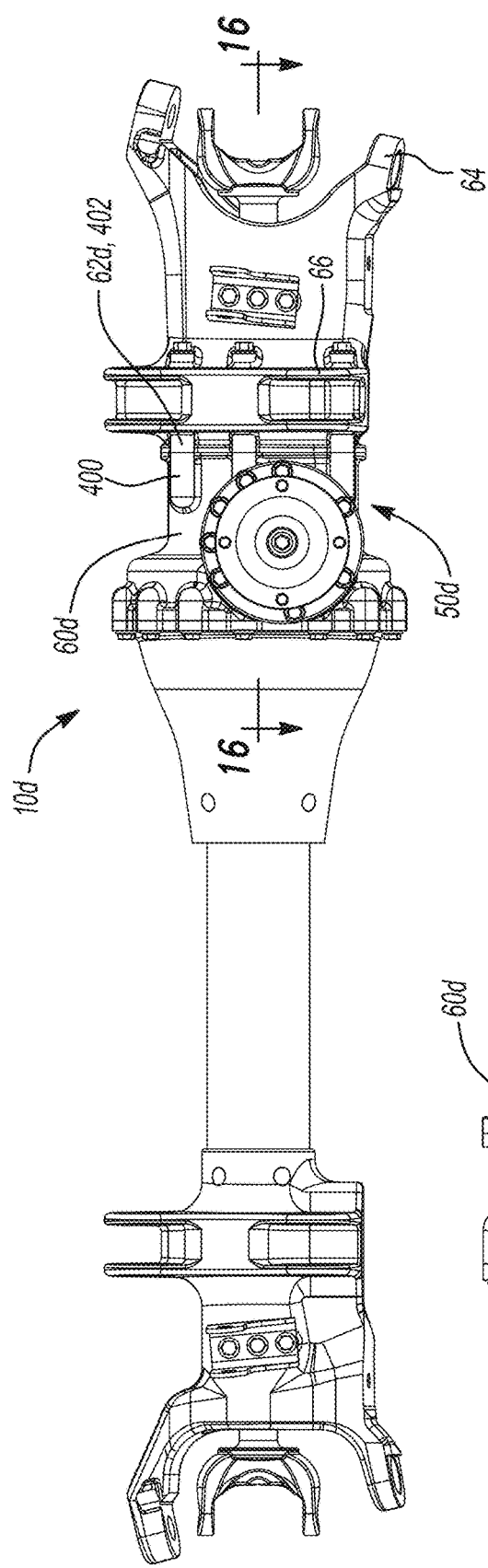
FIG. 15 is a rear elevation view of a portion of a fifth front axle assembly constructed in accordance with the teachings of the present disclosure.
Figure 16:
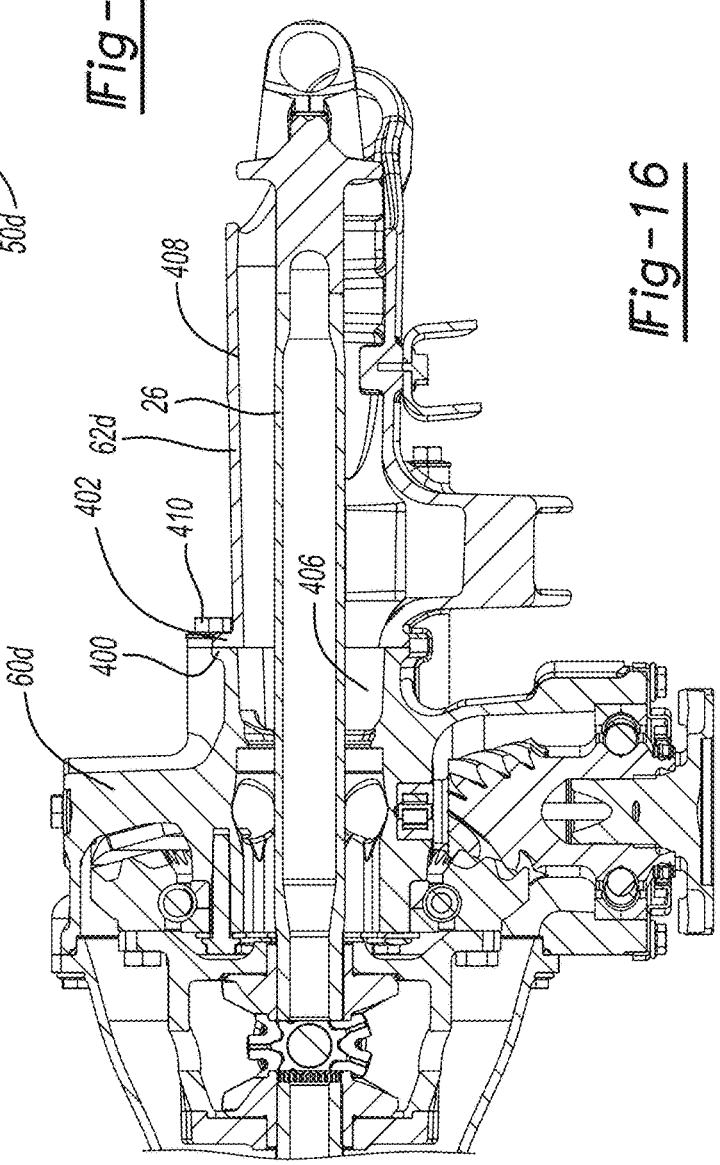
FIG. 16 is a section view taken along the line 16-16 of FIG. 15.

With reference to FIGS. 15 and 16, a fifth front axle assembly constructed in accordance with the teachings of the present disclosure is generally indicated by reference numeral 10*d*. In this example, the main housing portion 60*d* and the tubular portion 62*d* of the first housing half 50*d* can be formed with mating flanges 400 and 402, respectively, rather than being integrally and unitarily formed, as shown in FIGS. 2 and 3, or with a socket-and-tube configuration that is depicted in FIGS. 13 and 14. The flange 400 on the main housing portion 60d includes a plurality of threaded apertures (not specifically shown) that are disposed about a shaft aperture 406. The shaft aperture 406 is configured to receive the first output member 26 there through. The flange 402 on the tubular portion 62d extends radially outwardly from the annular wall 408 of the tubular portion 62d. A plurality of through holes (not specifically shown) are formed through the flange 402 on the tubular portion 62d. Bolts 410 are received through the through holes in the flange 402 and threadably engage the threaded apertures in the flange 400 to fixedly but removably couple the flanges 400 and 402 to one another. If desired, a seal (not shown) can be disposed between the flanges 400 and 402 to inhibit the egress of fluid from or the ingress of fluid into the interior of the front axle assembly 20d. Construction of the front axle assembly 20d in this manner may be desirable for example when the tubular portion 62d of the first housing half 50d is relatively short and the steering yoke 64 is unitarily and integrally formed with the tubular portion 62d.

Figure 17:
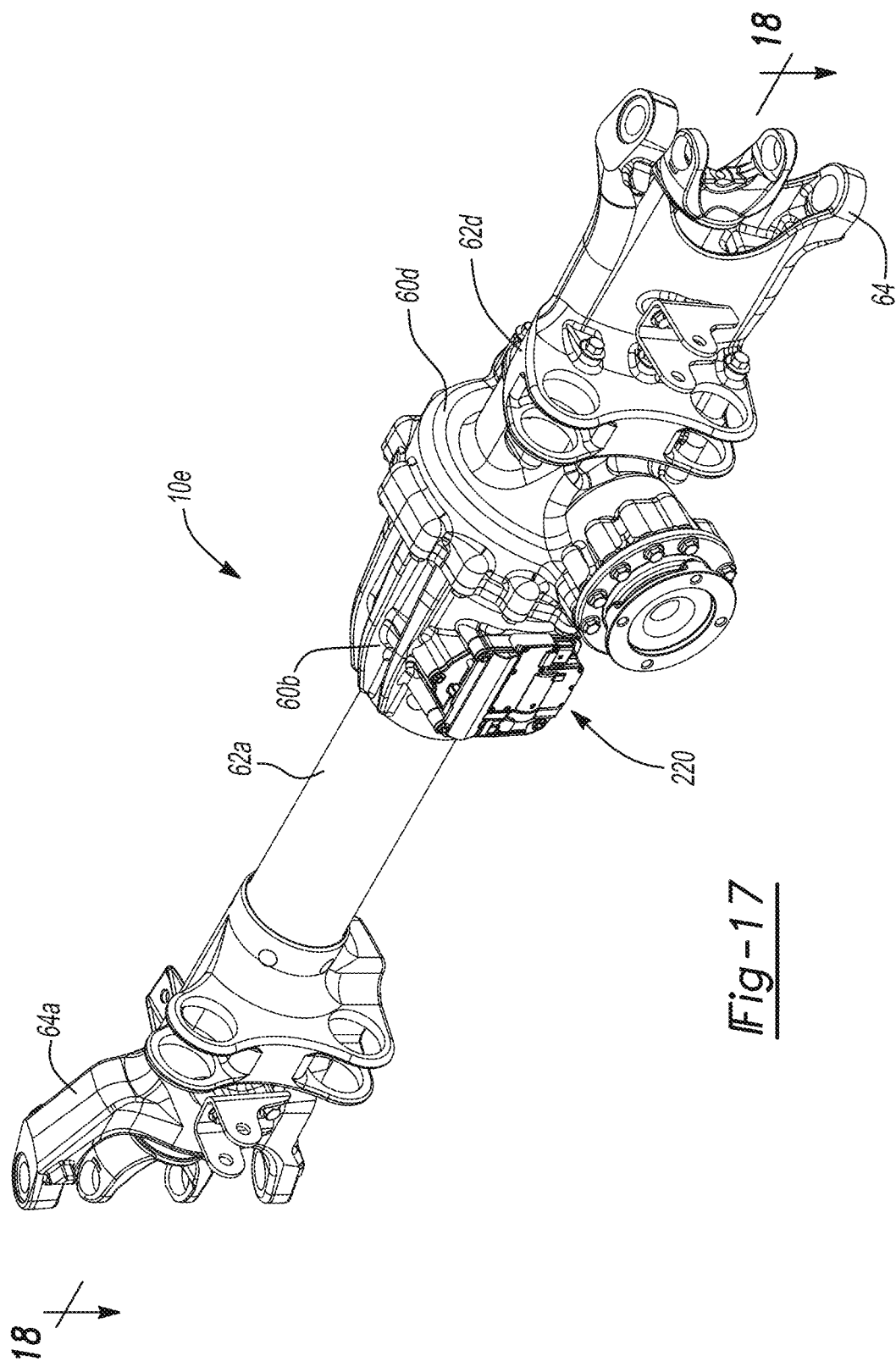
FIG. 17 is a perspective view of sixth front axle assembly constructed in accordance with the teachings of the present disclosure.
Figure 18:
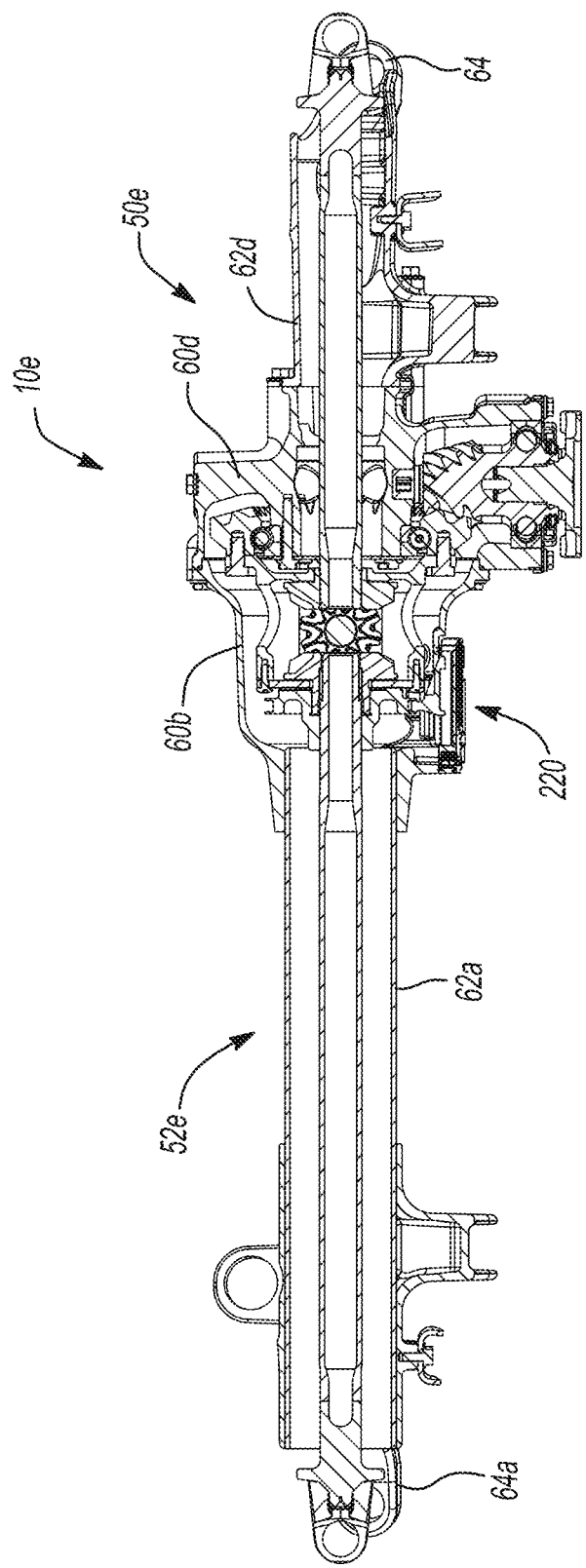
FIG. 18 is a longitudinal section view of the front axle assembly of FIG. 17.

With reference to FIGS. 17 and 18, a sixth front axle assembly constructed in accordance with the teachings of the present disclosure is generally indicated by reference numeral 10e. The front axle assembly 10e includes a first housing half 50e having the main housing portion 60d, tubular portion 62d and steering yoke 64 that are described above in the discussion of the example of FIGS. 15 and 16, and a second housing half 52e having the tubular portion 62a and steering yoke 64a that are described above in the discussion of the example of FIG. 5, as well as the main housing portion 60b and the multi-mode actuator assembly 220 that are described above in the discussion of the example of FIG. 8.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A front axle assembly comprising:
   first and second output members disposed for rotation about a rotary axis;
   speed differentiation means coupled to the first and second output members, the speed differentiation means being configured to permit speed differentiation between the first and second output members; and
   an axle housing having first and second housing halves, each of the first and second housing halves comprising a main housing portion, a tubular portion and a steering yoke, the main housing portion defining a cavity that houses at least a portion of the speed differentiation means, the tubular portion being fixedly coupled to the main housing portion and extending between the main housing portion and the steering yoke, the steering yoke being fixedly coupled to the tubular portion, wherein an annular joint structure is formed where the first and second first housing halves are coupled to one another, wherein the annular joint structure is formed about the rotary axis such that one of the first and second housing halves is inserted into the other one of the first and second housing halves along an insertion axis that is coincident with the rotary axis;
   wherein the tubular portion of the first housing half has a circumferentially-extending wall member and wherein in at least one cross-section taken through the wall member in a corresponding plane that is perpendicular to the rotary axis, the thickness of the wall member is not uniform around the circumference of the wall member.

2. The front axle assembly of claim 1, wherein the tubular portion and the steering yoke of the first housing half is integrally and unitarily formed as a casting.

3. The front axle assembly of claim 2, wherein the first housing half comprises an isolator mount that is unitarily and integrally formed with the tubular portion and the steering yoke.

4. The front axle assembly of claim 1, wherein the main housing portion, the tubular portion and the steering yoke of the first housing half is integrally and unitarily formed as a casting.

5. The front axle assembly of claim 1, wherein the front axle assembly has a top surface when the front axle assembly is positioned in a working orientation, wherein a wall member of each of the tubular portions is thickest where the wall member forms a portion of the top surface of the front axle assembly.

6. The front axle assembly of claim 1, wherein the second housing half is an assembly in which the tubular portion is inserted into the main housing portion and secured thereto by a first weld.

7. The front axle assembly of claim 6, wherein the main housing portion of the second housing half defines a first socket that is sized to engage the tubular portion in an interference fit, and wherein the first weld comprises a plurality of slug welds.

8. The front axle assembly of claim 7, wherein the tubular portion and the steering yoke of the second housing half are secured together by a second weld.

9. The front axle assembly of claim 8, wherein the steering yoke of the second housing half defines a second socket that is sized to engage the tubular portion in an interference fit, and wherein the second weld comprises a plurality of slug welds.

10. The front axle assembly of claim 6, wherein the tubular portion and the steering yoke of the second housing half are unitarily and integrally formed.

11. The front axle assembly of claim 1, further comprising: an input pinion;
   an input pinion bearing mounted to the input pinion and the housing assembly, the input pinion bearing supporting the input pinion for rotation about a pinion axis relative to the housing assembly and being configured to transmit thrust loads between the housing assembly and the input pinion in both axial directions along the pinion axis;
   a ring gear coupled to an input of the speed differentiation means and meshingly engaged to the input pinion; and
   a ring gear bearing mounted to the ring gear and the housing assembly, the ring gear bearing supporting the ring gear for rotation about the rotary axis relative to the housing assembly and being configured to transmit thrust loads between the housing assembly and the ring gear in both axial directions along the rotary axis.

12. The front axle assembly of claim 11, wherein the input pinion bearing is a four-point angular contact bearing.

13. The front axle assembly of claim 11, wherein at least a portion of a bearing race of the input pinion bearing is unitarily and integrally formed with the input pinion.

14. The front axle assembly of claim 11, wherein the ring gear bearing is a four-point angular contact bearing.

15. The front axle assembly of claim 11, wherein at least a portion of a bearing race of the ring gear bearing is unitarily and integrally formed with the ring gear.

16. The front axle assembly of claim 11, wherein the input pinion bearing and the ring gear bearing are mounted to the main housing portion of the first housing half.

17. The front axle assembly of claim 11, wherein the ring gear bearing is disposed radially inward of the ring gear.

18. The front axle assembly of claim 1, further comprising a multi-mode actuator having a disconnect coupling and a lock coupling, the disconnect coupling being selectively operable for rotatably coupling an output of the speed differentiation means to one of the first and second output members, the lock coupling being selectively operable for rotatably coupling the one of the first and second output members to an input of the speed differentiation means.

19. The front axle assembly of claim 18, wherein the multi-mode actuator comprises a carrier member, wherein the disconnect coupling comprises a first splined segment, which is formed on the carrier member, and a second splined segment that is formed on the output of the speed differentiation means, and wherein the lock coupling comprises a first set of engagement features, which are formed on the carrier member, and a second set of engagement features that are non-rotatably coupled to the input of the speed differentiation means.

20. The front axle assembly of claim 19, wherein the lock coupling is a dog clutch.

21. A vehicle driveline component comprising:
a differential case defining an internal cavity, the differential case being rotatable about an axis;
a differential gearset received in the internal cavity, the differential gearset having first and second side gears;
a shaft that is rotatable about the axis;
a coupler received in the internal cavity and non-rotatably a engaged to the shaft;
a carrier member received in the internal cavity and movable along the axis between a first position, a second position and a third position;
wherein the coupler is rotationally decoupled from both the differential case and the first side gear when the carrier member is disposed in the first position, wherein the coupler and the first side gear are rotationally coupled and the differential case is not rotationally coupled to either of the coupler and the first side gear when the carrier member is disposed in the second position, and wherein the differential case, the first side gear and the coupler are rotationally coupled when the carrier member is disposed in the third position.

22. The vehicle driveline component of claim 21, wherein the carrier member forms a first portion of a dog clutch and wherein a second portion of the dog clutch is rotationally coupled to the differential case.

23. The vehicle driveline component of claim 21, wherein the coupler has an internally splined aperture that is slidably engaged to a male splined segment formed on the shaft.

24. The vehicle driveline component of claim 21, wherein the coupler has an internally splined aperture that is slidably engagable to a male splined segment formed on the first side gear.

25. The vehicle driveline component of claim 21, further comprising an apply plate mounted to the differential case, the apply plate having a plurality of legs that extend through an axial end of the differential case, the legs abutting carrier member.

26. The vehicle driveline component of claim 25, further comprising a fork, the apply plate being engaged with the fork in a manner that permits relative rotation but inhibits relative axial movement along the axis.

27. A front axle assembly comprising:
first and second output members disposed for rotation about a rotary axis;
speed differentiation means coupled to the first and second output members, the speed differentiation means being configured to permit speed differentiation between the first and second output members; and
an axle housing having first and second housing halves, each of the first and second housing halves comprising a main housing portion, a tubular portion and a steering yoke, the main housing portion defining a cavity that houses at least a portion of the speed differentiation means, the tubular portion being fixedly coupled to the main housing portion and extending between the main housing portion and the steering yoke, the steering yoke being fixedly coupled to the tubular portion, wherein an annular joint structure is formed where the first and second first housing halves are coupled to one another, wherein the annular joint structure is formed about the rotary axis such that one of the first and second housing halves is inserted into the other one of the first and second housing halves along an insertion axis that is coincident with the rotary axis;
wherein the second housing half is an assembly in which the tubular portion is inserted into the main housing portion and secured thereto by a first weld; and
wherein the main housing portion of the second housing half defines a first socket that is sized to engage the tubular portion in an interference fit, and wherein the first weld comprises a plurality of slug welds.

28. The front axle assembly of claim 27, wherein the tubular portion and the steering yoke of the second housing half are secured together by a second weld.

29. The front axle assembly of claim 28, wherein the steering yoke of the second housing half defines a second socket that is sized to engage the tubular portion in an interference fit, and wherein the second weld comprises a plurality of slug welds.

30. The front axle assembly of claim 29, wherein the tubular portion and the steering yoke of the second housing half are unitarily and integrally formed.

* * * * *

UNITED STATES PATENT AND TRADEMARK OFFICE
CERTIFICATE OF CORRECTION

| | | |
|---|---|---|
| PATENT NO. | : 11,371,600 B2 | Page 1 of 1 |
| APPLICATION NO. | : 16/621176 | |
| DATED | : June 28, 2022 | |
| INVENTOR(S) | : Gregory A. Marsh et al. | |

It is certified that error appears in the above-identified patent and that said Letters Patent is hereby corrected as shown below:

In the Claims

In Column 13, Line 41 (Claim 21), before "engaged", delete "a" therefor.

Signed and Sealed this
Ninth Day of August, 2022

Katherine Kelly Vidal
*Director of the United States Patent and Trademark Office*